United States Patent
Kurata et al.

(10) Patent No.: US 10,969,924 B2
(45) Date of Patent: Apr. 6, 2021

(54) INFORMATION PROCESSING APPARATUS, METHOD, AND NON-TRANSITORY COMPUTER READABLE MEDIUM THAT CONTROLS A REPRESENTATION OF A USER OBJECT IN A VIRTUAL SPACE

(71) Applicants: SONY CORPORATION, Tokyo (JP); SO-NET CORPORATION, Shinagawa-ku (JP)

(72) Inventors: Masatomo Kurata, Tokyo (JP); Hideyuki Ono, Kanagawa (JP); Sota Matsuzawa, Tokyo (JP); Akikazu Takeuchi, Tokyo (JP); Takayoshi Muramatsu, Tokyo (JP)

(73) Assignees: SONY CORPORATION, Tokyo (JP); SO-NET CORPORATION, Tokyo (JP)

( * ) Notice: Subject to any disclaimer, the term of this patent is extended or adjusted under 35 U.S.C. 154(b) by 606 days.

(21) Appl. No.: 14/763,603

(22) PCT Filed: Jan. 8, 2014

(86) PCT No.: PCT/JP2014/050108
§ 371 (c)(1),
(2) Date: Jul. 27, 2015

(87) PCT Pub. No.: WO2014/136466
PCT Pub. Date: Sep. 12, 2014

(65) Prior Publication Data
US 2015/0365449 A1    Dec. 17, 2015

(30) Foreign Application Priority Data
Mar. 8, 2013  (JP) ................................ 2013-047040

(51) Int. Cl.
*G06F 3/0481* (2013.01)
*G06F 3/01* (2006.01)
(Continued)

(52) U.S. Cl.
CPC .......... *G06F 3/04815* (2013.01); *A63F 13/65* (2014.09); *G06F 3/011* (2013.01);
(Continued)

(58) Field of Classification Search
CPC ............. A63F 2300/5553; A63F 13/65; G06F 3/04815; G06F 3/0486; G06F 3/04883;
(Continued)

(56) References Cited

U.S. PATENT DOCUMENTS

2007/0112922 A1    5/2007  Kurata et al.
2009/0106672 A1*   4/2009  Burstrom ................ A63F 13/12
                                                       715/757
(Continued)

FOREIGN PATENT DOCUMENTS

CN    101751220 A     6/2010
JP    2006-345269 A   12/2006
(Continued)

OTHER PUBLICATIONS

Extended Search Report dated Sep. 19, 2016 in European Patent Application No. 14760654.5.
(Continued)

*Primary Examiner* — Nicholas Ulrich
(74) *Attorney, Agent, or Firm* — Xsensus LLP

(57) ABSTRACT

Provided is an information processing apparatus including: a first information acquisition unit configured to acquire first information indicating behavior of at least one user; a second information acquisition unit configured to acquire second information on the at least one user, the second information being different from the first information; and a display control unit configured to display, in a display unit, a user object which is configured based on the first information and represents the corresponding at least one user (Continued)

and a virtual space which is configured based on the second information and in which the user object are arranged.

34 Claims, 19 Drawing Sheets

(51) Int. Cl.
    *A63F 13/65* (2014.01)
    *G06K 9/00* (2006.01)
    *G06F 3/0482* (2013.01)
    *H04L 29/06* (2006.01)
    *G06F 3/0486* (2013.01)
    *G06F 3/0488* (2013.01)
    *G06F 3/0484* (2013.01)
    *G06Q 50/00* (2012.01)

(52) U.S. Cl.
    CPC .......... *G06F 3/0482* (2013.01); *G06F 3/0486* (2013.01); *G06F 3/04842* (2013.01); *G06F 3/04883* (2013.01); *G06K 9/00335* (2013.01); *H04L 65/403* (2013.01); *A63F 2300/5553* (2013.01); *G06Q 50/01* (2013.01)

(58) Field of Classification Search
    CPC .... G06F 3/011; G06F 3/0482; G06F 3/04842; G06K 9/00335; H04L 65/403; G06Q 50/01
    See application file for complete search history.

(56) References Cited

U.S. PATENT DOCUMENTS

| | | | |
|---|---|---|---|
| 2009/0251457 A1* | 10/2009 | Walker | G06T 17/10 345/418 |
| 2010/0042387 A1* | 2/2010 | Gibbon | G06Q 30/02 703/6 |
| 2010/0146433 A1 | 6/2010 | Murata et al. | |
| 2011/0081634 A1 | 4/2011 | Kurata et al. | |
| 2012/0026177 A1* | 2/2012 | Johlic | G09G 5/00 345/522 |
| 2012/0253489 A1 | 10/2012 | Dugan | |
| 2012/0331564 A1 | 12/2012 | Enoki et al. | |
| 2013/0305168 A1 | 11/2013 | Murata et al. | |
| 2015/0066174 A1 | 3/2015 | Dugan | |

FOREIGN PATENT DOCUMENTS

| | | |
|---|---|---|
| JP | 2010-134802 A | 6/2010 |
| JP | 2011-81431 A | 4/2011 |
| JP | 2013-8232 A | 1/2013 |
| JP | 2013-20587 A | 1/2013 |

OTHER PUBLICATIONS

International Search Report dated Apr. 8, 2014, in PCT/JP2014/050108, filed Jan. 8, 2014.
Combined Chinese Office Action and Search Report dated Nov. 24, 2017 in corresponding Patent Application No. 201480011894.2 (with English Translation), 22 pages.
European Office Action dated May 18, 2018 in corresponding European Application No. 14 760 654.5, 6 pages.

\* cited by examiner

FIG. 7
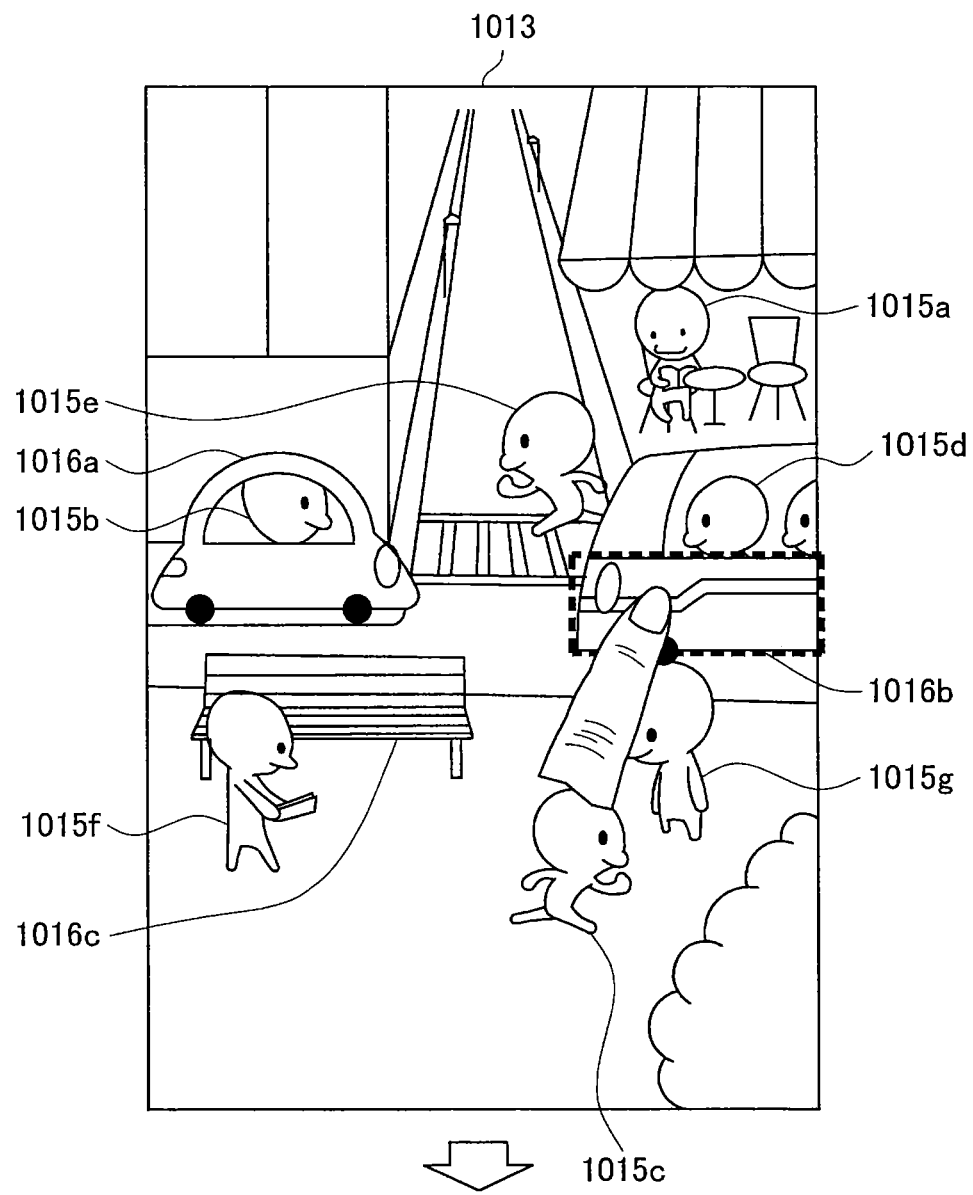
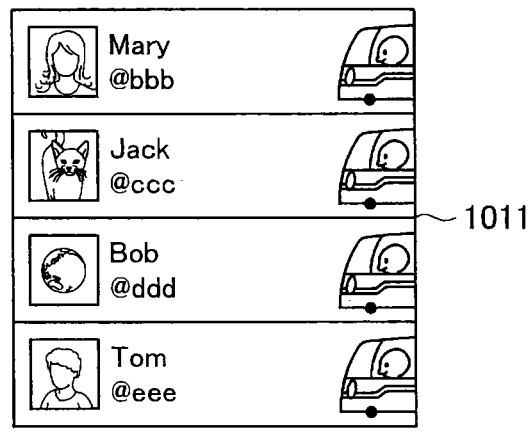

FIG. 8
Group A  ~1025a
|  | A | B | C | D |
|---|---|---|---|---|
| Age | 21 | 34 | 19 | 48 |
| Occupation | Student | Office Worker | Part-timer | Housewife |
| Book Score | 84 | 79 | 91 | 82 |
| Music Score | 25 | 60 | 12 | 3 |
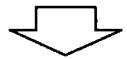
"Bookstore" TownView
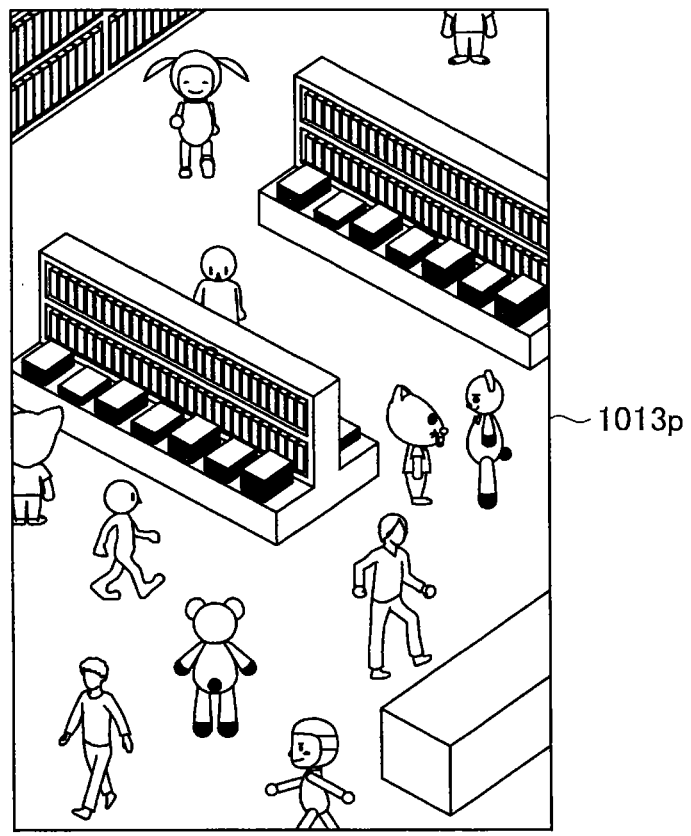

FIG. 9
Group B                                          ~1025b
|            | A       | B           | C       | D           |
|------------|---------|-------------|---------|-------------|
| Age        | 21      | 18          | 19      | 16          |
| Occupation | College Student | High School Student | College Student | High School Student |
| Book Score | 1       | 14          | 8       | 10          |
| Music Score| 2       | 40          | 2       | 6           |
"young & students" TownView
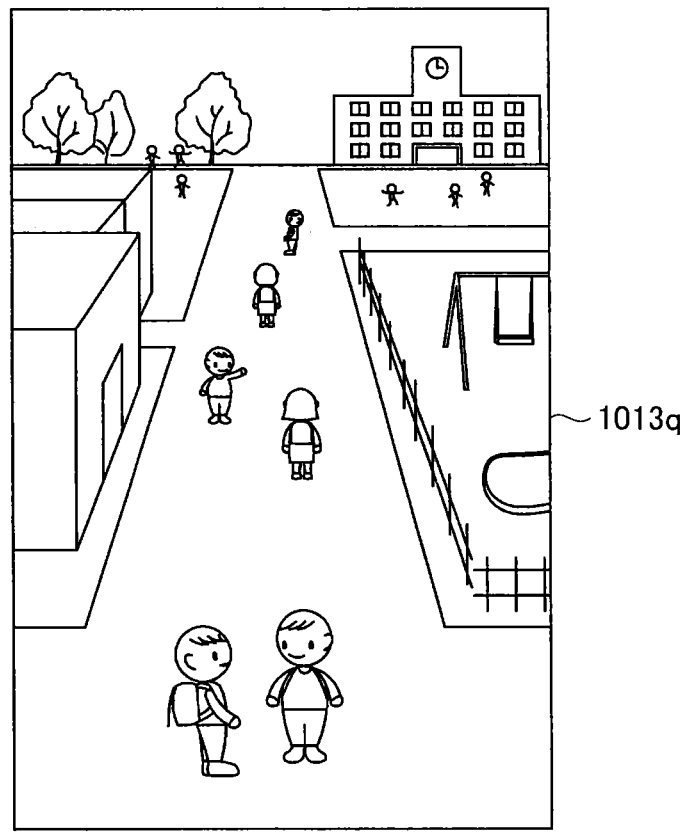

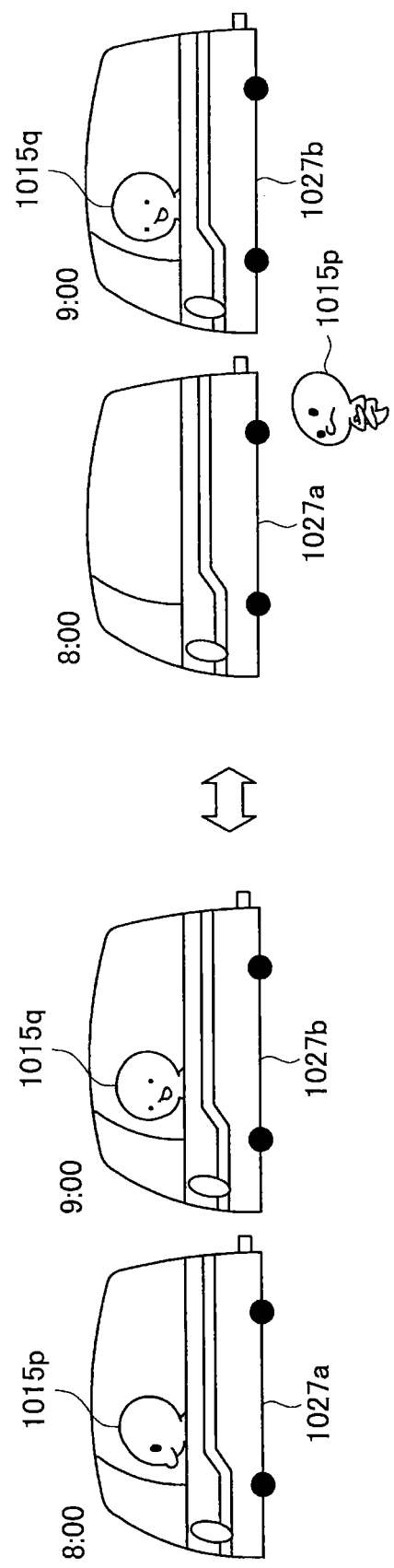

FIG. 14
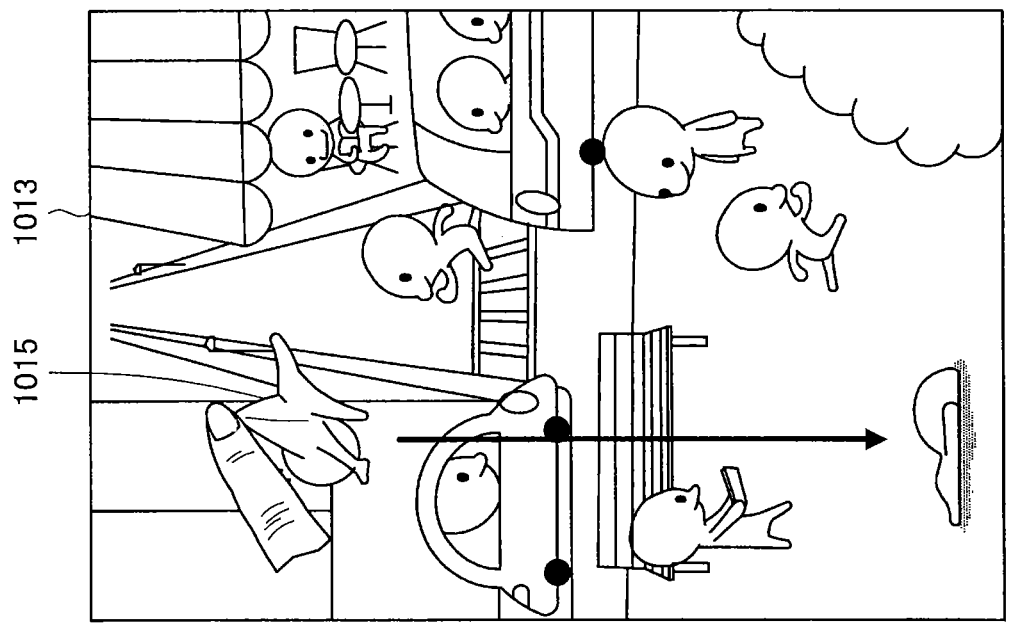
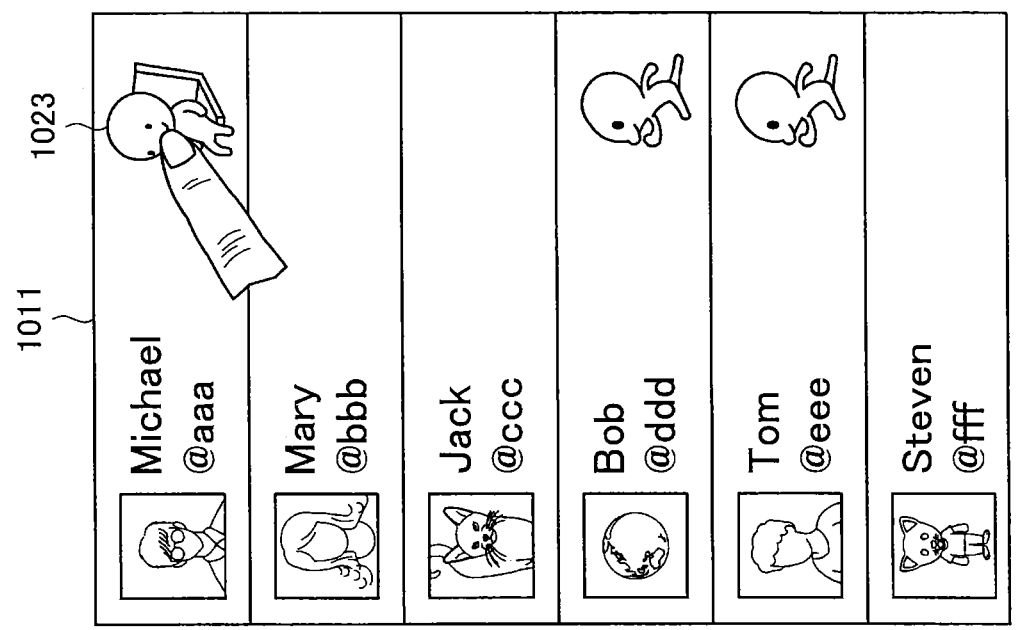

INFORMATION PROCESSING APPARATUS, METHOD, AND NON-TRANSITORY COMPUTER READABLE MEDIUM THAT CONTROLS A REPRESENTATION OF A USER OBJECT IN A VIRTUAL SPACE

TECHNICAL FIELD

The present disclosure relates to an information processing apparatus, a system, an information processing method, and a program.

BACKGROUND ART

In accordance with diffusion of social media, it has become common for users to share their behavior via a network. For example, Patent Literature 1 discloses a technology for reflecting, in postures of objects representing other users, actual behavior of the users, such as walking, running, sitting, standing, and making a phone call in a virtual space displayed on a screen and expressing intimacy of a user with the users and actual positions, characteristics of behavior, and taste of the users by using display positions of the objects.

CITATION LIST

Patent Literature

Patent Literature 1: JP 2010-134802A

SUMMARY OF INVENTION

Technical Problem

However, it cannot be said that, for example, the technology disclosed in Patent Literature 1 has been satisfactorily developed, and it can be said that usability of a user interface and other aspects can be further improved.

In view of this, the present disclosure proposes an information processing apparatus, a system, an information processing method, and a program, each of which is new and improved and is capable of providing a user interface that can be used more easily in the case where users share their behavior information via user objects displayed in a virtual space.

Solution to Problem

According to the present disclosure, there is provided an information processing apparatus including: a first information acquisition unit configured to acquire first information indicating behavior of at least one user; a second information acquisition unit configured to acquire second information on the at least one user, the second information being different from the first information; and a display control unit configured to display, in a display unit, a user object which is configured based on the first information and represents the corresponding at least one user and a virtual space which is configured based on the second information and in which the user object are arranged.

According to the present disclosure, there is provided a system including: a terminal apparatus; and one or more server devices configured to provide a service to the terminal apparatus. The system provides, by cooperating the terminal apparatus with the one or more server devices, a function for acquiring first information indicating behavior of at least one user, a function for acquiring second information on the at least one user, the second information being different from the first information, and a function for displaying, in a display unit, a user object which is configured based on the first information and represents the corresponding at least one user, and a virtual space which is configured based on the second information and in which the user object is arranged.

According to the present disclosure, there is provided an information processing method including: acquiring first information indicating behavior of at least one user; acquiring second information on the at least one user, the second information being different from the first information; and displaying, in a display unit, a user object which is configured based on the first information and represents the corresponding at least one user, and a virtual space which is configured based on the second information and in which the user object is arranged.

According to the present disclosure, there is provided a program causing a computer to realize a function for acquiring first information indicating behavior of at least one user, a function for acquiring second information on the at least one user, the second information being different from the first information, and a function for displaying, in a display unit, a user object which is configured based on the first information and represents the corresponding at least one user, and a virtual space which is configured based on the second information and in which the user object is arranged.

In the above configurations, the behavior of the users is reflected in the respective user objects, and the virtual space in which the user objects are arranged is configured based on some information of the users. With this, for example, attributes or characteristics of the behavior of the users displayed as the user objects can be grasped based on the virtual space serving as a background of the user objects. This improves usability of a user interface for sharing behavior information of the users via the user objects.

Advantageous Effects of Invention

As described above, according to the present disclosure, it is possible to provide a user interface that can be used more easily in the case where users share their behavior information via user objects displayed in a virtual space.

BRIEF DESCRIPTION OF DRAWINGS

FIG. 7 is a view illustrating an example of collective selection in an example of FIG. 6.

FIG. 8 is a view illustrating a first example of setting of a virtual space in some embodiments of the present disclosure.

FIG. 9 is a view illustrating a second example of setting of a virtual space in some embodiments of the present disclosure.

FIG. 11 is a view illustrating an example of operation of a virtual space in some embodiments of the present disclosure.

FIG. 14 is a view illustrating outline of grouping operation of a user in some embodiments of the present disclosure.

DESCRIPTION OF EMBODIMENTS

Figure 1:
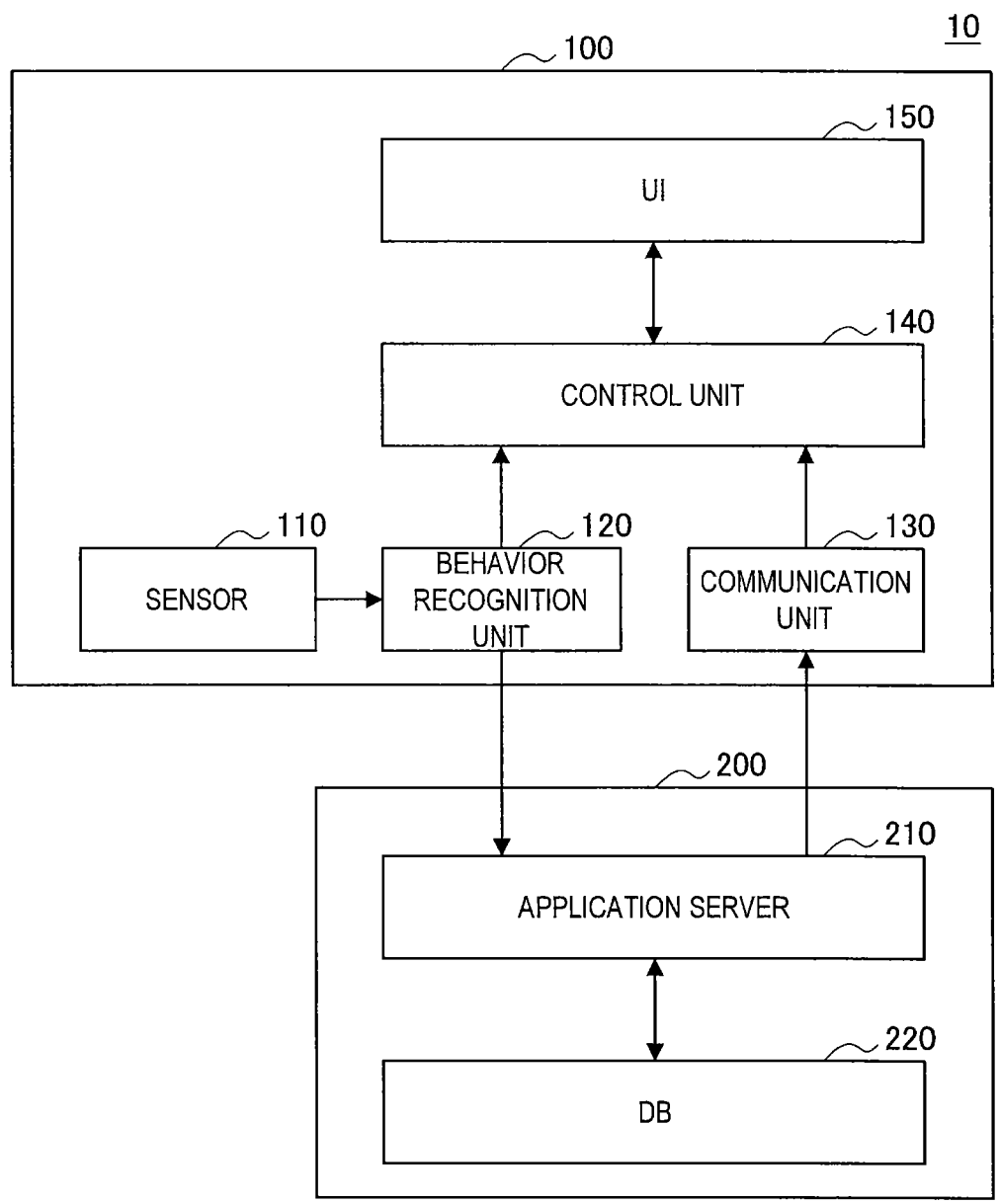
FIG. 1 is a block diagram schematically showing Embodiment 1 of the present disclosure.

Hereinafter, (a) preferred embodiment(s) of the present disclosure will be described in detail with reference to the appended drawings. Note that, in this specification and the drawings, elements that have substantially the same function and structure are denoted with the same reference signs, and repeated explanation is omitted.

Note that description will be provided in the following order.

1. Examples of embodiments
1-1. Embodiment 1
1-2. Embodiment 2
1-3. Embodiment 3
2. Behavior information sharing
3. Behavior status display
4. Setting of virtual space
5. Operation performed on object
6. Grouping of user
7. Hardware configuration
8. Supplement 1. Examples of Embodiments With reference to FIGS. 1 to 3, examples of embodiments of the present disclosure will be described.

1-1. Embodiment 1

FIG. 1 is a block diagram schematically showing Embodiment 1 of the present disclosure. With reference to FIG. 1, a system 10 according to this embodiment includes a terminal apparatus 100 and a server 200. The terminal apparatus 100 is a terminal apparatus carried by a user, such as a smartphone, a tablet terminal, a portable game console, and a portable media player, and can be realized by, for example, a hardware configuration of an information processing apparatus described below. The server 200 communicates with one or more terminal apparatuses 100 via various wired or wireless networks and provides various services to the terminal apparatuses 100. The server 200 is realized by a single server device or a plurality of server devices that are connected with each other via a network to cooperate with each other. The server device can be realized by, for example, the hardware configuration of the information processing apparatus described below.

(Terminal Apparatus)

The terminal apparatus 100 includes, as a functional configuration, a sensor 110, a behavior recognition unit 120, a communication unit 130, a control unit 140, and a user interface (UI) 150.

The sensor 110 is any of various sensors such as an acceleration sensor, a gyro sensor, a magnetic field sensor, an optical sensor, a sound sensor, and a pressure sensor and detects acceleration, a posture, a direction, and a surrounding environment, and the like of a user of the terminal apparatus 100. The sensor 110 may include positioning means such as a GPS sensor or a Wi-Fi communication unit for acquiring position information of the user.

The behavior recognition unit 120 is realized by software in such a way that a processor such as a CPU operates in accordance with a program. Note that a functional configuration, such as the behavior recognition unit 120, which is described to be realized by software in the present specification, may be realized by a processing circuit such as an application specific integrated circuit (ASIC). The behavior recognition unit 120 recognizes behavior of the user of the terminal apparatus 100 on the basis of a detection result of the sensor 110 and acquires information (behavior information) indicating the behavior of the user. For example, the behavior recognition unit 120 may recognize whether a user is stopping, walking, or running on the basis of a detection result of acceleration or the like. Further, the behavior recognition unit 120 may recognize more advanced behavior, i.e., for example, may recognize whether a user is working, stays at home, or is shopping by combining a detection result of acceleration or the like with position information of the user. The behavior recognition unit 120 transmits the information indicating the recognized behavior of the user to the server 200. The behavior recognition unit 120 may also provide the information indicating the behavior of the user to the control unit 140.

The communication unit 130 is realized by, for example, various wired or wireless communication devices. The communication unit 130 receives behavior information of at least one user from the server 200. Herein, the users whose behavior information is received may include the user of the terminal apparatus 100 or may include at least one user (other users) other than the user of the terminal apparatus 100. The behavior information of other users can be acquired by, for example, sensors 110 and behavior recognition units 120 of other terminal apparatuses 100 and be transmitted to the server 200. Further, as described below, the communication unit 130 may receive, from the server 200, information different from the behavior information such as information indicating an attribute of each user or information obtained by performing statistical processing on the behavior information of each user. The communication unit 130 provides the received information to the control unit 140.

The control unit 140 is realized by software in such a way that a processor such as a CPU operates in accordance with a program. The control unit 140 displays an image in a display unit included in the UI 150 on the basis of the information acquired from the communication unit 130. Note that, in the present specification, the image includes a still image and a moving image. The control unit 140 may output audio from a speaker or the like included in the UI 150 on the basis of the information acquired from the communication unit 130. The image displayed by the control unit 140 in the UI 150 includes a user object and a virtual space in which the user object is arranged. Further, the control unit 140 may acquire operation performed by a user via an operation unit included in the UI 150 and may change the image to be displayed on the basis of the operation. Furthermore, the control unit 140 may execute operation with respect to a user displayed as a user object, such as grouping or the like of the user, on the basis of the operation performed by the user. Moreover, the control unit 140 may specify a behavior status on the basis of behavior information of each user and reflect the behavior status in each user object.

Herein, the user object is an object representing each of at least one user and is configured based on the behavior information of each user received by the communication unit 130 and/or the behavior information provided from the behavior recognition unit 120. That is, the user object is displayed for a user whose behavior information is provided. Note that it is unnecessary to display all user objects of users whose behavior information is provided, and only a user specified by the user of the terminal apparatus 100, such as a user classified in a specific group, may be displayed.

Meanwhile, the virtual space is configured based on information different from the behavior information. This information may be, for example, information indicating an attribute of each user or information obtained by performing statistical processing on the behavior information of each user. The control unit 140 configures an image to be displayed as the virtual space that is common to the user objects by, for example, combining the above information of each of the users displayed as the user objects. The image to be displayed as the virtual space may be selected from, for example, images that have been set in advance or may be newly generated by converting a numerical value extracted from information on each user in accordance with a predetermined rule.

The UI 150 is realized by, for example, the display unit (output device) that displays an image such as a display and the operation unit (input device) that acquires operation performed by a user on the displayed image, such as a touch panel or a mouse. The UI 150 displays an image in accordance with control of the control unit 140 and provides, to the control unit 140, information indicating operation performed by a user on the displayed image. The output device included in the UI 150 may further include an audio output unit such as a speaker.

(Server)

The server 200 includes, as a functional configuration, an application server 210 and a database (DB) 220.

The application server 210 is realized by software in such a way that a processor such as a CPU operates in accordance with a program. The application server 210 executes various kinds of calculation for providing an application service to the terminal apparatus 100 while referring to the DB 220.

For example, the application server 210 accumulates, in the DB 220, information indicating behavior of a user received from the terminal apparatus 100 and transmits the accumulated information to the terminal apparatus 100 as necessary. By such processing, for example, information indicating behavior of a plurality of users recognized in the terminal apparatuses 100 used by the respective users is collected in the DB 220. In response to a request from the user through the terminal apparatus 100, the application server 210 reads information indicating behavior of another user from the DB 220 to transmit the information to the terminal apparatus 100. This makes it possible that the users share behavior information.

The application server 210 acquires information (information different from behavior information) used for configuring the virtual space in the control unit 140 of the terminal apparatus 100 to transmit the information to the terminal apparatus 100. For example, the application server 210 may collect profile information (information indicating attribute of user) registered by each user in the DB 220 and transmit the profile information to the terminal apparatus 100 as necessary. Further, the application server 210 may execute statistical processing with respect to the behavior information of the user accumulated in the DB 220 and transmit information obtained by the processing, such as a behavior pattern of the user, to the terminal apparatus 100.

The DB 220 is realized by, for example, a storage device and stores various kinds of information to be processed by the application server 210. For example, the DB 220 stores the behavior information of each user received by the application server 210 from the terminal apparatus 100. The DB 220 may store the information indicating the attribute of each user acquired by the application server 210 and the information generated by the application server 210 performing the statistical processing on the behavior information of each user.

In Embodiment 1 of the present disclosure described above, for example, the communication unit 130 functions as a first information acquisition unit that acquires behavior information of a user (in the case where behavior information of a user him/herself of the terminal apparatus 100 is internally acquired, the behavior recognition unit 120 also functions as the first information acquisition unit). The communication unit 130 also functions as a second information acquisition unit that acquires information on the user different from the behavior information (for example, attribute information or information obtained by performing statistical processing on behavior information). The control unit 140 functions as a display control unit that displays a user object, which is configured based on the behavior information and represents each user, and a virtual space, which is configured based on the information different from the behavior information and in which the user object is arranged, in the display unit included in the UI 150. Therefore, it can be also said that the terminal apparatus 100 is an information processing apparatus including those constituent elements.

In the above description, Embodiment 1 of the present disclosure has been described. Note that the above is schematic description, and the terminal apparatus 100 and the server 200 can further include a functional configuration other than the functional configurations shown in FIG. 1. For example, the terminal apparatus 100 may further include a database and may hold a cache of the information stored in the DB 220 of the server 200. With this, for example, behavior information for use in display of an image including a user object in the terminal apparatus 100, such as behavior information of a friend of a user of the terminal apparatus 100, is held in the terminal apparatus 100, and therefore it is unnecessary to receive the behavior information from the server 200 every time when the image including the user object is displayed. In this case, the behavior information stored in the database of the terminal apparatus 100 can be subjected to incremental update by the application server 210 of the server 200 referring to the behavior information stored in the DB 220.

Further, in the above example, although a terminal apparatus that provides behavior information of a user to the server and a terminal apparatus that displays an image including a user object on the basis of information such as the behavior information collected in the server are the same, those terminal apparatuses can be independently configured as a modification example. For example, a function of the above terminal apparatus 100 may be realized by the following dispersed terminals: a sensor log terminal 100a that includes the sensor 110 and the behavior recognition unit 120 and acquires sensing data to recognize behavior of a user and transmits behavior information to the server 200; and a display terminal 100b that includes the communication unit 130, the control unit 140, and the UI 150 and displays an image including a user object on the basis of information received from the server 200. In this case, the display terminal 100b is not necessarily a terminal apparatus carried by a user, and may be, for example, a stationary PC, television, or game console.

Because behavior recognition is executed and behavior information of a user is generated in the terminal apparatus 300, this embodiment has an advantage in protecting privacy of the behavior information. For example, a user may select whether to transmit behavior information obtained as a result of behavior recognition to the server. This makes it possible that, for example, the user keeps behavior information that the user does not want to share in the terminal apparatus 100 without transmitting the behavior information to the server 200.

1-2. Embodiment 2

Figure 2:
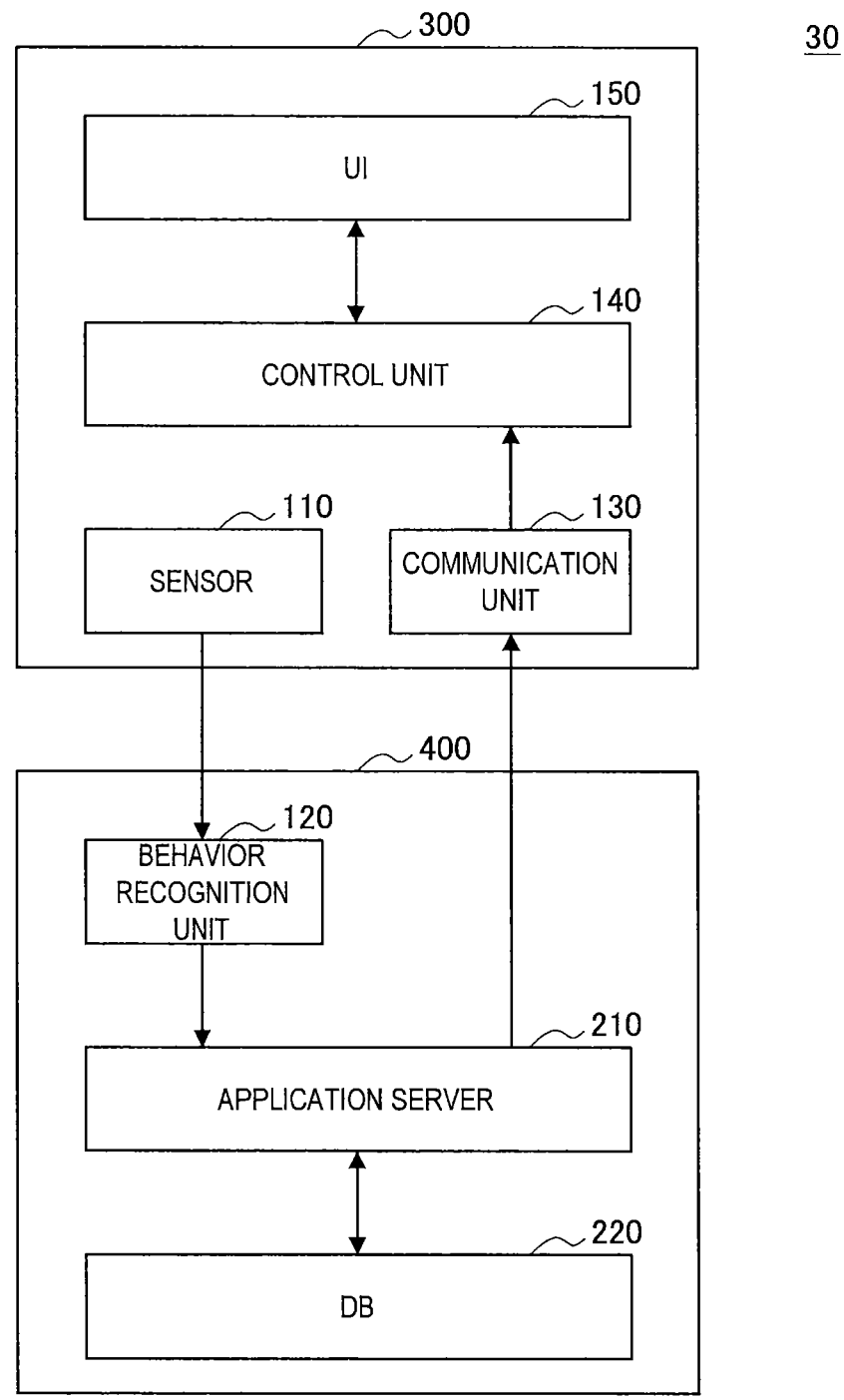
FIG. 2 is a block diagram schematically showing Embodiment 2 of the present disclosure.

FIG. 2 is a block diagram schematically illustrating Embodiment 2 of the present disclosure. With reference to FIG. 2, a system 30 according to this embodiment includes a terminal apparatus 300 and a server 400. The terminal apparatus 300 is a terminal apparatus carried by a user, such as a smartphone, a tablet terminal, a portable game console, and a portable media player, and can be realized by, for example, a hardware configuration of an information processing apparatus described below. The server 400 communicates with one or more terminal apparatuses 300 via various wired or wireless networks and provides various services to the terminal apparatuses 300. The server 400 is realized by a single server device or a plurality of server devices that are connected with each other via a network to cooperate with each other. The server device can be realized by, for example, the hardware configuration of the information processing apparatus described below.

In this embodiment, as illustrated in FIG. 2, the terminal apparatus 300 includes, as a functional configuration, a sensor 110, a communication unit 130, a control unit 140, and a UI 150, and the server 400 includes, as a functional configuration, a behavior recognition unit 120, an application server 210, and a DB 220. This embodiment is different from Embodiment 1 described above in that the behavior recognition unit 120 is not included in the terminal apparatus 300 but is included in the server 400. Therefore, each terminal apparatus 300 transmits a detection result of the sensor 110 to the server 400 and the server 400 recognizes behavior of each user on the basis of the detection result of the sensor 110 received from each terminal apparatus 300.

Note that details of each functional configuration are similar to those in Embodiment 1 described above, and therefore repeated description will be omitted. Also in this embodiment, as a modification example, a terminal apparatus that provides sensing data of a user to the server and a terminal apparatus that displays an image including a user object on the basis of information such as behavior information collected in the server can be independently configured. For example, a function of the above terminal apparatus 300 may be realized by the following dispersed terminals: a sensor log terminal 300a that includes the sensor 110 and acquires sensing data and provides the sensing data to the server 400; and a display terminal 300b that includes the communication unit 130, the control unit 140, and the UI 150 and displays an image including a user object on the basis of information received from the server 400. In this case, the display terminal 300b is not necessarily a terminal apparatus carried by a user, and may be, for example, a stationary PC, television, or game console.

Also in Embodiment 2 of the present disclosure described above, for example, the communication unit 130 functions as a first information acquisition unit that acquires behavior information of a user and also as a second information acquisition unit that acquires information on the user different from the behavior information. The control unit 140 functions as a display control unit that displays a user object, which is configured based on the behavior information and represents each user, and a virtual space, which is configured based on the information different from the behavior information and in which the user object is arranged, in a display unit included in the UI 150. Therefore, it can be also said that the terminal apparatus 300 is an information processing apparatus including those constituent elements.

As compared to Embodiment 1 described above, this embodiment has an advantage in reducing power consumption of the terminal apparatus 300 because the terminal apparatus 300 does not need to execute calculation for behavior recognition. Further, in the case where the sensor log terminal 300a is independently provided as described in the modification example, a processing circuit such as a processor for behavior recognition is not needed, and therefore it is possible to reduce a size and a weight of the sensor log terminal 300a and also reduce power consumption thereof.

1-3. Embodiment 3

Figure 3:
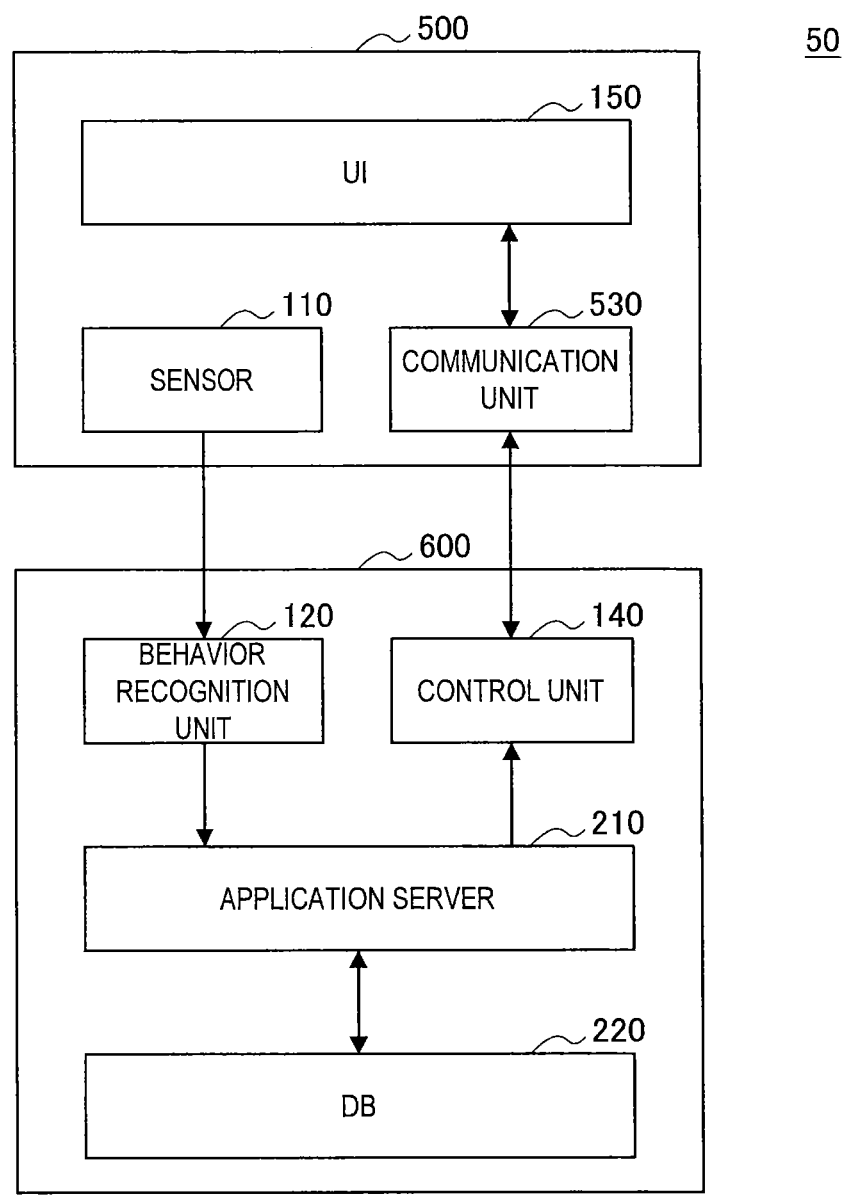
FIG. 3 is a block diagram schematically showing Embodiment 3 of the present disclosure.

FIG. 3 is a block diagram schematically illustrating Embodiment 3 of the present disclosure. With reference to FIG. 3, a system 50 according to this embodiment includes a terminal apparatus 500 and a server 600. The terminal apparatus 500 is a terminal apparatus carried by a user, such as a smartphone, a tablet terminal, a portable game console, and a portable media player, and can be realized by, for example, a hardware configuration of an information processing apparatus described below. The server 600 communicates with one or more terminal apparatuses 500 via various wired or wireless networks and provides various services to the terminal apparatuses 500. The server 600 is realized by a single server device or a plurality of server devices that are connected with each other via a network to cooperate with each other. The server device can be realized by, for example, the hardware configuration of the information processing apparatus described below.

In this embodiment, as described in FIG. 3, the terminal apparatus 500 includes, as a functional configuration, a sensor 110, a communication unit 530, and a UI 150, and the server 600 includes, as a functional configuration, a behavior recognition unit 120, a control unit 140, an application server 210, and a DB 220. This embodiment is different from Embodiments 1 and 2 described above in that the server 600 includes the control unit 140 in addition to the behavior recognition unit 120. Therefore, each terminal apparatus 500 transmits a detection result of the sensor 110 to the server 600 and receives data of an image including a user object generated in the server 600 to display the image on the UI 150.

The communication unit 530 is realized by, for example, various wired or wireless communication devices. The communication unit 530 receives the data of the image including the user object including the user object from the server 600. The image including the user object is generated based on behavior information and other information in the control unit 140 included in the server 600. Further, the communication unit 530 may acquire information indicating operation performed by a user on the image including the user object from the UI 150 and transmit the information to the server 600 so that the control unit 140 can change the image including the user object on the basis of the operation.

Note that details of each functional configuration other than the communication unit 530 are similar to those in Embodiment 1 described above, and therefore repeated description will be omitted. Also in this embodiment, as a modification example, a terminal apparatus that provides sensing data of a user to the server and a terminal apparatus that receives data of an image including a user object from the server to display the data can be independently configured. For example, a function of the above terminal apparatus 500 may be realized by the following dispersed terminals: a sensor log terminal 500a that includes the sensor 110 and acquires sensing data and provides the sensing data to the server 600; and a display terminal 500b that includes the communication unit 530 and the UI 150 and displays an image including a user object by use of data received from the server 600. In this case, the display terminal 500b is not necessarily a terminal apparatus carried by a user, and may be, for example, a stationary PC, television, or game console.

In Embodiment 3 of the present disclosure described above, for example, the behavior recognition unit 120 and the application server 210 function as a first information acquisition unit that acquires behavior information of a user. The application server 210 also functions as a second information acquisition unit that reads, from the DB 220, attribute information that is additionally provided and acquires information on the user different from the behavior information by performing statistical processing on the behavior information. The control unit 140 functions as a display control unit that displays a user object, which is configured based on the behavior information and represents each user, and a virtual space, which is configured based on the information different from the behavior information and in which the user object is arranged, in a display unit included in the UI 150 of the terminal apparatus 500 via the communication unit 530. Therefore, it can be also said that the server 600 is an information processing apparatus including those constituent elements.

As compared to Embodiments 1 and 2 described above, this embodiment is the most advantageous in terms of power consumption of the terminal apparatus 500 because the terminal apparatus 500 does not need to execute even calculation for generating the image including the user object. Meanwhile, in this embodiment, because the image including the user object is generated in the server 600, the server 600 grasps not only the behavior information of the user but also an operation state in the UI 150. Therefore, the above two embodiments can have an advantage over this embodiment in terms of privacy.

As described above, in the embodiments of the present disclosure, it is possible to employ various variations regarding which part in the system each functional configuration is arranged. As a matter of course, examples of such variations are not limited to the above three examples and the modification examples thereof.

2. Behavior Information Sharing

Figure 4:
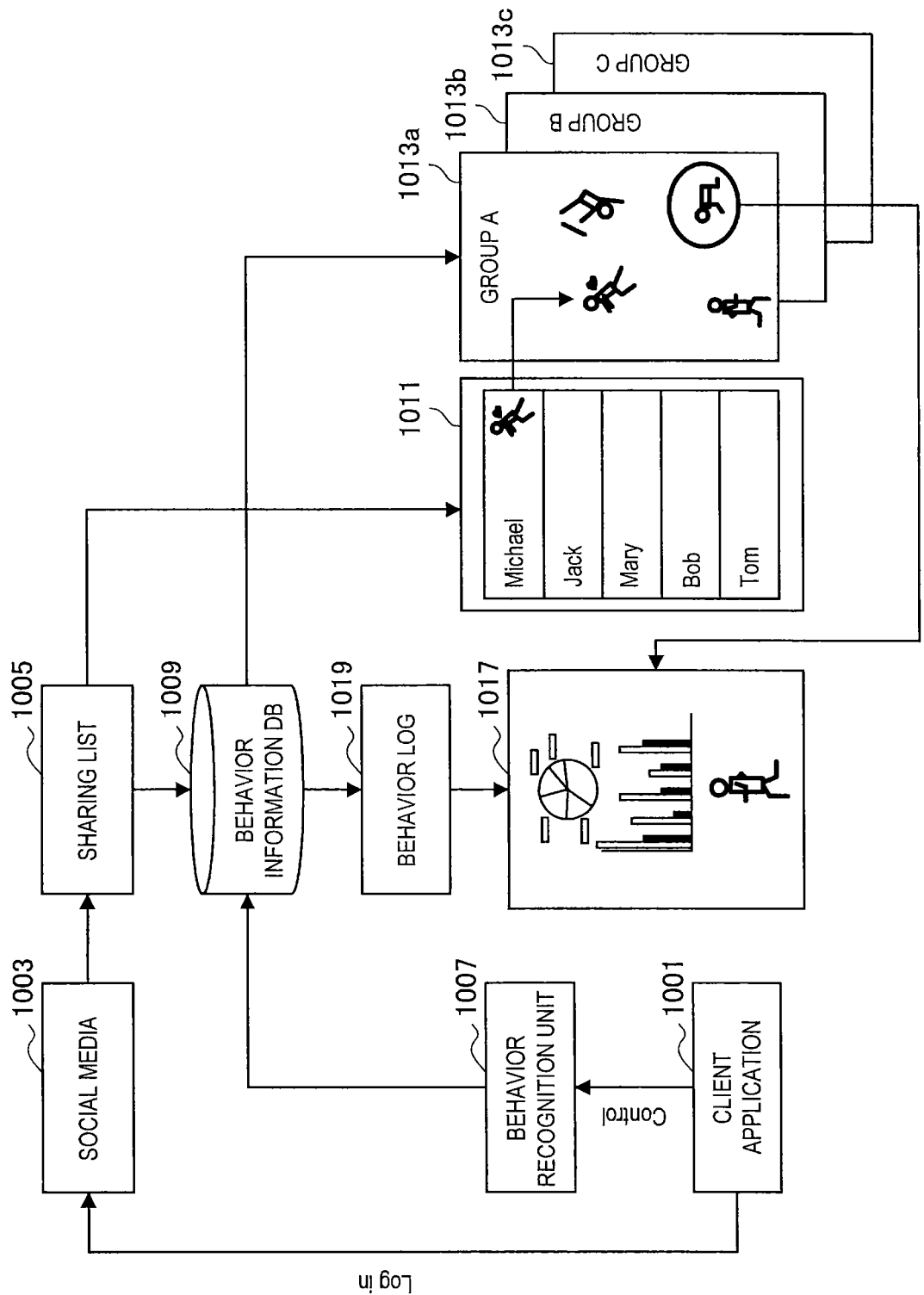
FIG. 4 is a view illustrating behavior information sharing in some embodiments of the present disclosure.
Figure 5:
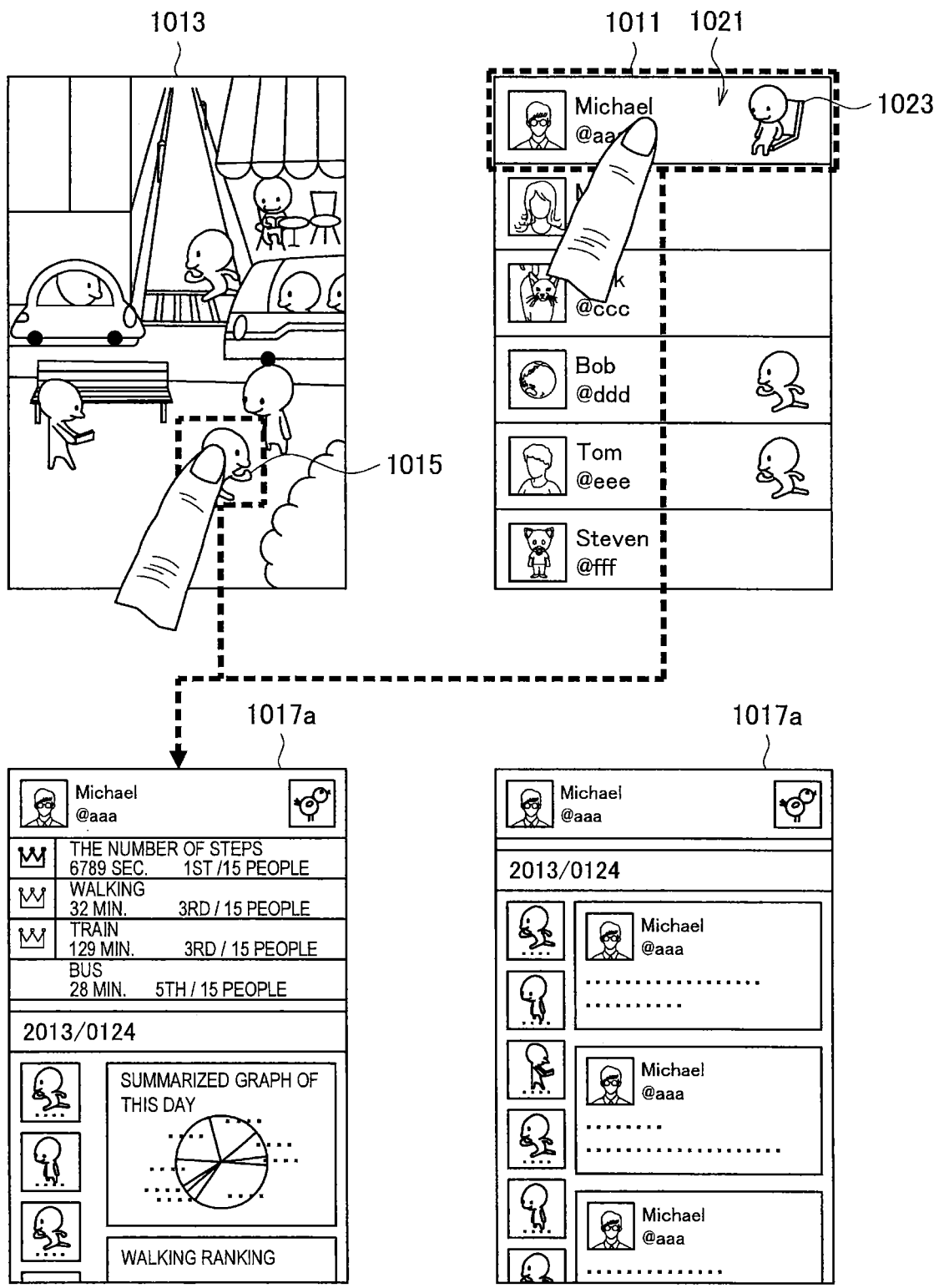
FIG. 5 is a view illustrating a display example for the behavior information sharing illustrated in FIG. 4.

With reference to FIG. 4 and FIG. 5, behavior information sharing in some embodiments of the present disclosure will be described. In, for example, each embodiment described above, behavior information of each user is shared via a user object displayed by the control unit 140. In the following description, such behavior information sharing including examples of data to be referred, a screen to be displayed, and the like will be described more specifically.

Note that, in the following description, a "behavior status" is information indicating behavior of a user classified based on a predetermined reference. For example, in the following description, "resting", "running", "moving by vehicle", and the like will be exemplified as the behavior status, but other various behavior statuses can be set. Granularity of the behavior status can be changed depending on, for example, the kind of virtual space 1013 in some cases. For example, behavior statuses of "moving by vehicle", "moving by bus", and "moving by train" may be integrated and displayed as a single behavior status of "moving" in some cases. In the following description, a "behavior log" is information indicating a history of behavior of a user in the past. In some examples, the behavior log can be a history of the behavior status.

FIG. 4 is a view illustrating behavior information sharing in some embodiments of the present disclosure. With reference to FIG. 4, a user uses a client application 1001 provided in a terminal apparatus to log in social media 1003. The social media 1003 provides a sharing list 1005 regarding the user who has logged in. The sharing list 1005 is provided from the server that provides the social media 1003 to, for example, the control unit 140 in the embodiments described above. Note that, although the sharing list is provided from the social media in the example of FIG. 4, the sharing list may be provided by a member other than the social media in another example of the present disclosure. For example, a sharing list shared by friends may be prepared in such a way that a user and another user who is a user's friend directly exchange IDs.

Meanwhile, the client application 1001 controls a behavior recognition unit 1007 of the terminal apparatus or the server to cause the behavior recognition unit 1007 to provide behavior information of a user to a behavior information DB 1009. A plurality of users use the client applications 1001 to log in the social media 1003, and therefore behavior information of the users are collected in the behavior information DB 1009.

In the case where a user and another user share behavior information, in, for example, the embodiments described above, the control unit 140 may display a list 1011 of other users whose behavior information can be shared in the UI 150 in accordance with the sharing list 1005 and then display, in the virtual space 1013, a user object 1015 showing a behavior status of a user selected from the list 1011. Note that a specific display example of the virtual space 1013 and the user object 1015 will be described below.

Herein, in order to display the user object 1015, the control unit 140 acquires the behavior information of the user from the behavior information DB 1009. At this time, whether or not the behavior information of the user can be provided may be determined by referring to the sharing list 1005. A plurality of virtual spaces 1013 may be set for respective groups in which users are classified and the virtual spaces 1013 may be switched and displayed. In the example of FIG. 4, three virtual spaces 1013a, 1013b, and 1013c are set. Granularity of, for example, a behavior status that is set based on behavior information may be different among the virtual spaces 1013a, 1013b, and 1013c.

A user can refer to behavior log display 1017 of another user by selecting the user object 1015 displayed in the virtual space 1013 in the UI 150. The behavior log display 1017 is, for example, display of a behavior log of a target user expressed by a graph showing a ratio of behavior performed by the target user that day and a behavior pattern of the user in the past. The behavior log display 1017 can be generated based on a behavior log 1019 of the target user acquired from the behavior information DB 1009.

FIG. 5 is a view illustrating a display example for the behavior information sharing illustrated in FIG. 4. As illustrated in FIG. 5, the list 1011 is a list including information 1021 of each user as an element. In the information 1021 of each user, for example, a thumbnail image, a user name, an ID in the social media, and a behavior status are displayed as text, and a user object 1023 showing the behavior status may be displayed. Note that the user object 1023 and the user object 1015 displayed in the virtual space 1013 may be a common object. In the case where a user does not log in the social media 1003 or in the case where the user has logged in but behavior thereof is not recognized, the behavior status is not specified, and therefore there is a possibility that the text of the behavior status and the user object 1023 are not displayed in the information 1021 of each user.

Meanwhile, the virtual space 1013 is a space in which the user object 1015 representing each user is arranged. The user object 1015 shows the behavior status of each user by using a posture or a display position thereof. Therefore, there is a possibility that the user object 1015, as well as the user object 1023 in the list 1011, is not displayed in the case where the behavior status of the user is not specified. Further, as described below, the virtual space 1013 in which the user object 1015 is arranged is changed in accordance with, for example, an attribute, a behavior pattern, and the like of each user.

By selecting the information 1021 of each user displayed in the list 1011 or the user object 1015 of each user displayed in the virtual space 1013, it is possible to display the behavior log display 1017 of the user. FIG. 5 illustrates a behavior statistics display 1017a and a comment timeline display 1017b as two examples of the behavior log display 1017. The behavior statistics display 1017a is a display showing a result of statistical analysis of a behavior log of a target user and can include, for example, a graph showing a ratio of a behavior status of the user of a day and ranking display obtained by comparing an amount of specific behavior (a length of time spent walking, the number of steps, a length of time spent riding a train, and the like) of a user with that of another user. The comment timeline display 1017b displays a timeline of comments posted by the target user and displays a behavior status of the user at the time of posting each of the comments.

Herein, as described above, in the list 1011 and the virtual space 1013, a user him/herself of the terminal apparatus is displayed as the information 1021 or the user object 1015. By selecting them, it is also possible to display the user's own behavior log display 1017. In the user's own behavior log display 1017, all items can be basically displayed. Meanwhile, in the behavior log display 1017 of other users, an item that is permitted to be open by each user can be limitedly displayed. That is, a behavior log that is set to be closed by each user on the basis of, for example, the kind of behavior or a time period is not reflected in the behavior log display 1017.

A range of the behavior log displayed as the behavior log display 1017 and a method of displaying the behavior log in the behavior log display 1017 may be changed in accordance with a current behavior status of the target user. For example, in the case where the user is currently moving, only a behavior log regarding moving such as walking, a train, and a bus may be reflected in the behavior log display 1017. Alternatively, in the case where the user is currently working in an office, only a behavior log in the office may be reflected in the behavior log display 1017.

3. Behavior Status Display

Figure 6:
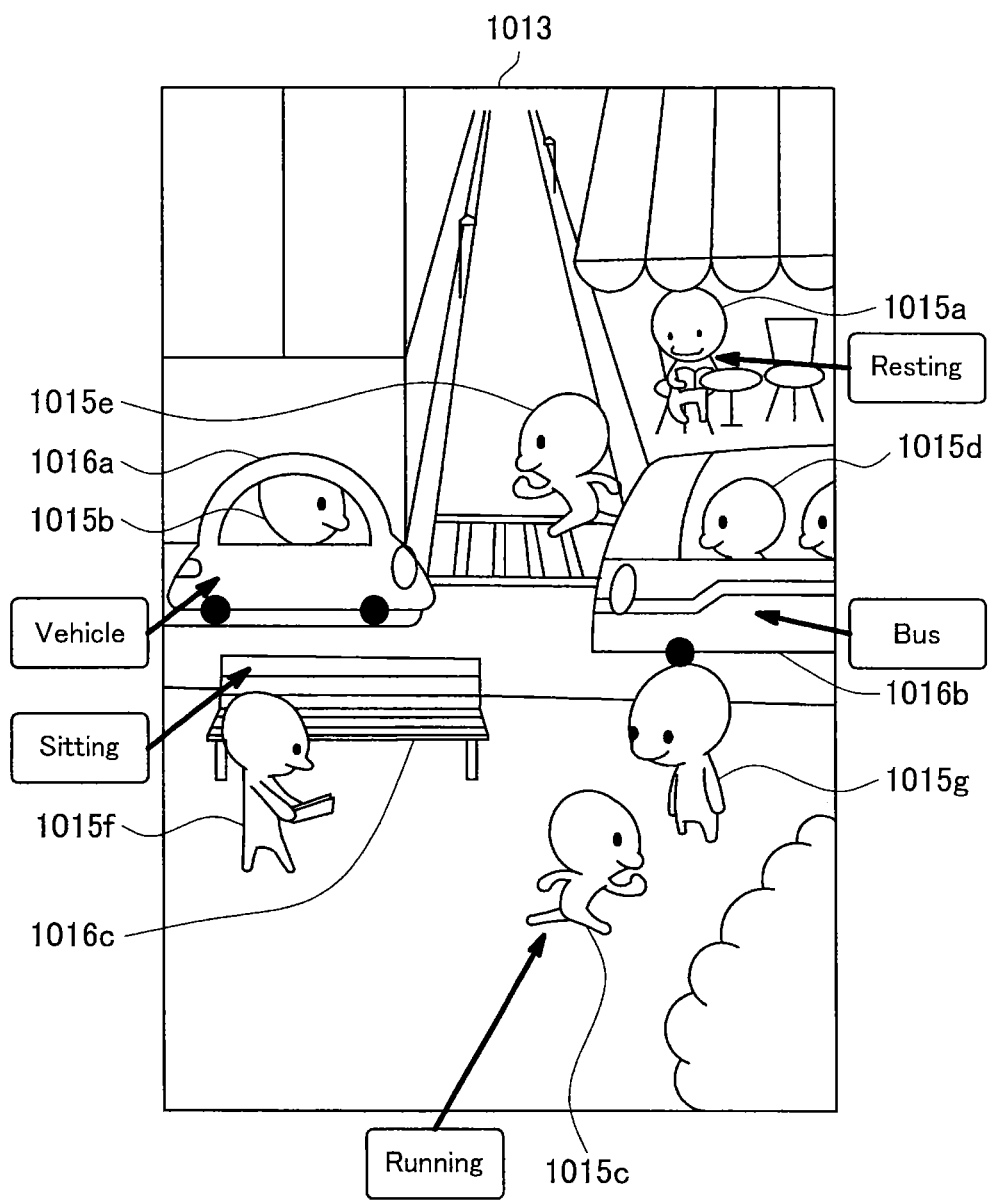
FIG. 6 is a view illustrating behavior status display in some embodiments of the present disclosure.

With reference to FIG. 6 and FIG. 7, behavior status display in some embodiments of the present disclosure will be described. In the behavior information sharing described above, the behavior status of each user is shared by displaying the user object 1015 showing the behavior status of each user in the virtual space 1013. In the following description, display of the behavior status will be described more specifically.

FIG. 6 is a view illustrating behavior status display in some embodiments of the present disclosure. In the example of FIG. 6, user objects 1015a to 1015g are displayed in the virtual space 1013.

(Expression Using User Object Itself)

As illustrated in the example of FIG. 6, each user object 1015 may express a behavior status of a corresponding user by using a posture (shape) or a motion thereof. For example, the user object 1015a is displayed in a sitting posture, which indicates that the behavior status of the user is "resting". The user objects 1015c and 1015e are displayed in a running posture and the user objects are actually running, which indicates that the behavior statuses of the users are "running". The user object 1015f is displayed in a posture holding a book, which indicates that the behavior status of the user is "reading". The user object 1015g is displayed as a standstill posture, which indicates that the behavior status of the user is "stopping".

(Expression Using Relationship with Another Object)

The user object 1015 may express a behavior status of a corresponding user by using another object (container object) displayed as a container thereof. For example, the user object 1015b is displayed in a container object 1016a of a vehicle running on a road, which indicates that the behavior status of the user is "moving by vehicle". The user object 1015d is displayed in a container object 1016b of a bus running on the road, which indicates that the behavior status of the user is "moving by bus".

Herein, the container object 1016 arranged in the virtual space 1013 is displayed based on, for example, a behavior pattern of a user displayed as the user object 1015 in the virtual space 1013 and can be displayed even in the case where a user who has a behavior status corresponding to the container object 1016 does not exist. For example, in the example of FIG. 6, a container object 1016*c* of a bench for indicating that a user sits is displayed, but a user object sitting on the bench is not displayed.

The number or a size of other objects displayed in association with the user object 1015 may be changed in accordance with the number of associated user objects 1015. For example, in the example of FIG. 6, in the case where the number of the user objects 1015 representing users riding a vehicle is increased, another vehicle may be additionally displayed. Further, in the example of FIG. 6, in the case where the number of the user objects 1015 representing users riding a bus is increased, a size of the bus may be increased. Further, the container object 1016 may be used as an operation element for, by selecting the container object 1016, collectively selecting users having the behavior status corresponding to the selected container object 1016. For example, as illustrated in FIG. 7, in the example of FIG. 6, in the case where the container object 1016*b* of the bus that is displayed in the virtual space 1013 in order to indicate that users ride on a bus is selected, all the users riding on the bus are collectively selected. The users who are collectively selected can be displayed as the list 1011 as illustrated in, for example, FIG. 7 or be set as a transmission destination of a message. Similar operation can be applied to, for example, the container object 1016 of the vehicle or the bench displayed in the virtual space 1013.

(Arrangement of User Object Corresponding to Behavior Status)

Arrangement of the user objects 1015 in the virtual space 1013 is determined in accordance with the behavior statuses expressed by the respective user objects 1015. In the example of FIG. 6, the user objects 1015*b* and 1015*d* corresponding to the users moving by vehicle or bus are arranged on the road drawn in the virtual space 1013. The user object 1015*a* corresponding to the resting user is arranged in a cafe drawn in the virtual space 1013. In the example of FIG. 6, the arrangement of each user object can be determined, for example, regardless of actual position information of each user. Therefore, for example, a plurality of users riding buses in different places can be expressed as the plurality of user objects 1015 riding the same bus.

Meanwhile, as to the user objects 1015*c* and 1015*e* corresponding to the running users, the user object 1015*c* is arranged in a park on a front side and the user object 1015*e* is arranged in a crosswalk on a deep side. This arrangement can indicate that the user corresponding to the user object 1015*c* runs in a place other than a road such as a park and the user corresponding to the user object 1015*e* runs on a road or a sidewalk. Thus, the arrangement of the user objects 1015 may reflect not only the behavior statuses expressed by the respective user objects 1015 but also the position information and the like of the users. Note that, in the example of FIG. 6, the kinds of positions of the users are reflected in the arrangement of the user objects 1015. Therefore, a user running on a road can be arranged on a crosswalk same as that of the user object 1015*e* regardless of on which road the user runs, and a user running in a place other than a road can be arranged in a park same as that of the user object 1015*c* regardless of whether or not the place is park. As another example, the user object 1015 representing a user taking an elevator may be arranged in a building displayed in the virtual space 1013.

In the above example, the number or a size of background objects, such as a road, a cafe, a park, a crosswalk, and a building, arranged in the virtual space 1013 may be changed in accordance with the number of the user objects 1015 arranged therein. For example, in the example of FIG. 6, in the case where the number of the user objects 1015 representing users moving by vehicle or bus becomes a predetermined number or more, a width of the road displayed in the virtual space 1013 may be increased. Further, for example, the number of the user objects 1015 representing users taking an elevator becomes a predetermined number or more, another building may be additionally displayed in the virtual space 1013.

4. Setting of Virtual Space

With reference to FIG. 8 to FIG. 11, setting of a virtual space in some embodiments of the present disclosure will be described. In the behavior information sharing described above, the behavior status of each user is shared by displaying the user object 1015 in which the behavior status of each user is reflected in the virtual space 1013. In the following description, setting of the virtual space 1013 in this case will be described more specifically.

FIG. 8 is a view illustrating a first example of setting of a virtual space in some embodiments of the present disclosure. In the example of FIG. 8, as the virtual space 1013 in which the user object 1015 representing a user classified in a group A is arranged, a virtual space ("Bookstore" town view) 1013*p* shaped like a bookstore is set. This is based on a characteristic in which, in profile information 1025*a* additionally provided from each user, each user classified in the group A has a high "Book Score" (set to 0 to 100) that is set based on a purchase history of books and the like.

FIG. 9 is a view illustrating a second example of setting of a virtual space in some embodiments of the present disclosure. In the example of FIG. 9, as the virtual space 1013 in which the user object 1015 representing a user classified in a group B is arranged, a virtual space ("young & student" town view) 1013*q* shaped like a school route is set. This is based on the fact that, in profile information 1025*b* additionally provided from each user, each user classified in the group B is in their late teens to early twenties and their occupation is a college student or a high school student.

Figure 10:
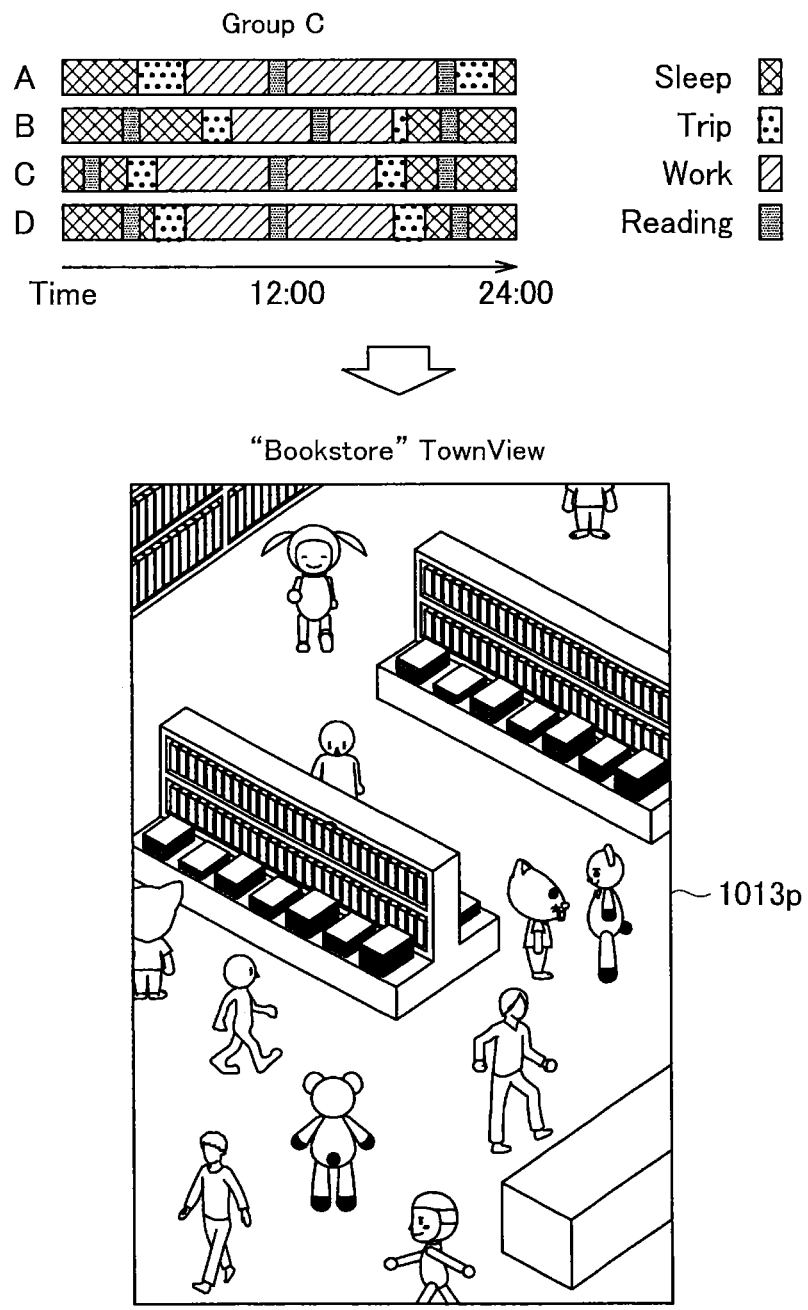
FIG. 10 is a view illustrating a third example of setting of a virtual space in some embodiments of the present disclosure.

FIG. 10 is a view illustrating a third example of setting of a virtual space in some embodiments of the present disclosure. In the example of FIG. 10, as the virtual space 1013 in which the user object 1015 representing a user classified in a group C is displayed, the virtual space ("Bookstore" town view) 1013*p* shaped like a bookstore is set, which is similar to the above first example. This can be based on the fact that, in an average behavior pattern extracted based on a behavior log, each user shares a characteristic in which a ratio of behavior "reading" is relatively high.

As described in the three examples described above, in some embodiments of the present disclosure, the virtual space 1013 serving as a background of the user object 1015 in an image including a user object is configured based on information (second information) different from behavior information (first information) of a user used for configuring the user object 1015. The virtual space 1013 can be configured based on a result of combination of the second information on users (for example, a result of various kinds of clustering including an average value, an intermediate value, and the like). In this case, the user objects 1015 representing the users can be arranged in the common virtual space 1013. Note that the image displayed as the virtual space 1013 may be selected from, for example, images that have been set in advance or may be newly generated by converting numerical values extracted from information on the users in accordance with a predetermined rule.

For example, in the above examples of FIG. 8 and FIG. 9, the virtual space 1013 is configured based on the profile information 1025 of each user. The profile information 1025 is an example of information indicating an attribute of a user and is generated based on, for example, age, occupation, a product purchase history, or the like of the user. As a matter of course, the profile information may be generated based on information other than the age, the occupation, and the product purchase history, and the virtual space 1013 may be configured based on information other than the profile information.

For example, in the above example of FIG. 10, the virtual space 1013 is configured based on information indicating a behavior pattern of each user. The information indicating the behavior pattern is an example of information obtained by performing statistical processing on behavior information of the user. The behavior pattern of the user is extracted in such a way that, for example, the application server 210 described in Embodiments 1 to 3 performs statistical processing on the behavior information of the user accumulated in the DB 220. Note that, as processing for extracting the behavior pattern, a publicly known technology described in, for example, JP 2011-81431A can be used, and therefore detailed description thereof will be herein omitted.

Further, in the example of FIG. 10, a part or all of the virtual space 1013 set for the group C may be changed with time by reflecting a behavior pattern that is common to the users classified in the group C. For example, in the example of FIG. 10, the behavior patterns of the users have common reading time at around 22:00. Based on this, for example, the regular virtual space 1013 may be changed to the virtual space 1013p shaped like a bookstore only between 21:30 to 23:00. Alternatively, in the virtual space 1013, display of each user object 1015 may be changed so that the user object 1015 possesses an object of a book only between 21:30 to 23:00.

FIG. 11 is a view illustrating an example of operation of a virtual space in some embodiments of the present disclosure. In the example of FIG. 11, user objects 1015 p and 1015q representing users P and Q are displayed in the virtual space 1013. The user P has a behavior pattern which is taking a bus at 8:00 every day. Meanwhile, the user Q has a behavior pattern which is taking a bus at 9:00 every day. Corresponding to this, a bus 1027a and a bus 1027b are displayed at 8:00 and 9:00, respectively, in the virtual space 1013. The bus 1027 can be displayed as the container object 1016 in the above example of FIG. 6. In the case where a behavior status of the user P indicates that the user P rides the bus as usual, the user object 1015p representing the user P rides the bus 1027a. Similarly, in the case where a behavior status of the user Q indicates that the user Q rides the bus as usual, the user object 1015q representing the user Q rides the bus 1027b.

Herein, the bus 1027a and the bus 1027b displayed in the virtual space 1013 may be displayed, regardless of whether or not the users P and Q ride the buses. More specifically, in the virtual space 1013, the bus 1027a may be operated at 8:00 every day and the bus 1027b may be operated at 9:00. In this case, for example, in the case where the user P does not ride the bus at 8:00 because the user P takes a vacation or the like, the user object 1015p representing the user P is displayed as another posture in another place in accordance with the behavior status of the user P at that time, whereas the bus 1027a is operated at 8:00 as usual. Note that, because the user P does not ride the bus, no user object rides the bus 1027a.

Thus, by controlling display of the virtual space 1013 or an object displayed in the virtual space 1013 on the basis of information such as a behavior pattern obtained by performing statistical processing on behavior information of a user, a characteristic of behavior of the user can be recognized based on the display of the virtual space 1013 without being influenced by temporary and irregular behavior of the user.

As application of such display, approach from a certain user to another user may be performed. For example, there is a case where a plurality of users have behavior patterns (behavior may be the same or different) in the same time period, such as a case where a user X has a behavior pattern "jogging at evening on Saturdays" and a user Y has a behavior pattern "riding a bicycle at evening on Saturdays". In this case, in the case where some of the plurality of users do not unexpectedly perform behavior in accordance with behavior patterns, another user may encourage the users to perform the behavior. In the above example, in the case where the user X is jogging but the user Y is not riding a bicycle at evening on Saturday, the user object 1015 representing the user X may encourage the user Y to ride the bicycle while jogging in the virtual space 1013 displayed in a terminal apparatus of the user Y.

5. Operation Performed on Object

With reference to FIG. 12 and FIG. 13, operation performed on an object in some embodiments of the present disclosure will be described. In the behavior information sharing described above, operation performed on information of each user or each real user can be executed by operating the user object 1015 displayed in the virtual space 1013 in the user interface. In the following description, operation performed on an object in this case will be described more specifically.

Figure 12A:
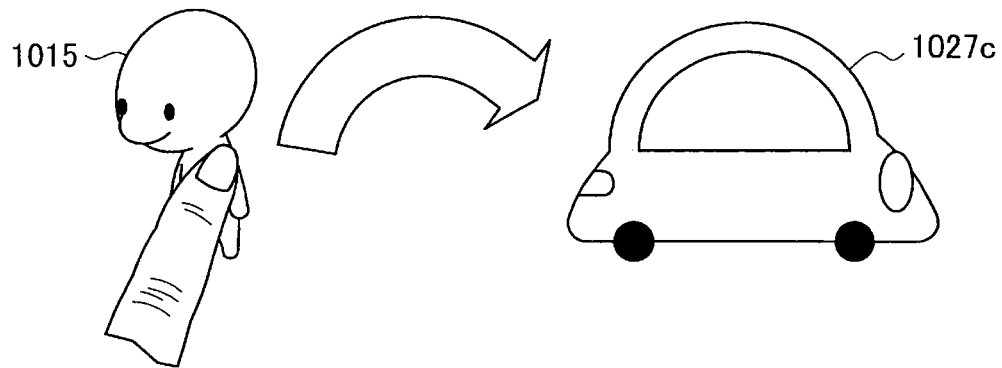
FIG. 12A is a view illustrating a first example of operation performed on an object in some embodiments of the present disclosure.

FIG. 12A is a view illustrating a first example of operation performed on an object in some embodiments of the present disclosure. In the example of FIG. 12A, a behavior status of a user is modified from "stopping" to "moving by vehicle" by moving the user object 1015 displayed in a stopping state to a car 1027c displayed in the virtual space 1013 through operation such as drag & drop. Note that, also in this example, display of the user object 1015 in the car 1027c indicates that the user is moving by car, which is similar to the example of FIG. 6. Thus, because an object (herein, car 1027c) corresponding to a behavior status of a user is displayed in the virtual space, modification operation of the behavior status can be executed by changing arrangement of the user object 1015. A result of such modification operation may be used for study in, for example, behavior recognition. In the example of FIG. 6, it is similarly possible to perform operation, such as causing a user to ride a bus, causing a user to sit in a cafe, or causing a user to sit on a bench.

Figure 12B:
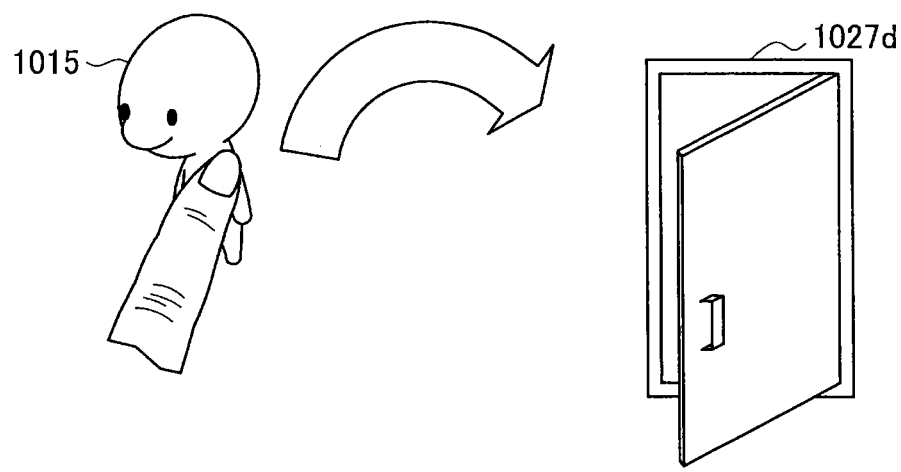
FIG. 12B is a view illustrating a second example of operation performed on an object in some embodiments of the present disclosure.

FIG. 12B is a view illustrating a second example of operation performed on an object in some embodiments of the present disclosure. In the example of FIG. 12B, a door 1027d appears when the user object 1015 is pressed for a long time. The user object 1015 is moved to the door 1027d by operation such as drag & drop, a user represented by the user object 1015 is deleted from a user group corresponding to the virtual space 1013 that is currently displayed. Thus, in the case where predetermined operation (herein, a long press) is executed with respect to the user object 1015, an object that has not been displayed in the virtual space 1013 until then can be newly made to appear, and operation performed on the user object 1015 or the user corresponding to the user object 1015 may be executed by using the object.

Figure 13A:
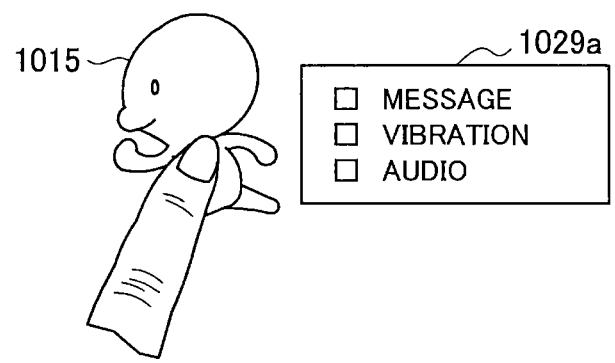
FIG. 13A is a view illustrating a third example of operation performed on an object in some embodiments of the present disclosure.
Figure 13B:
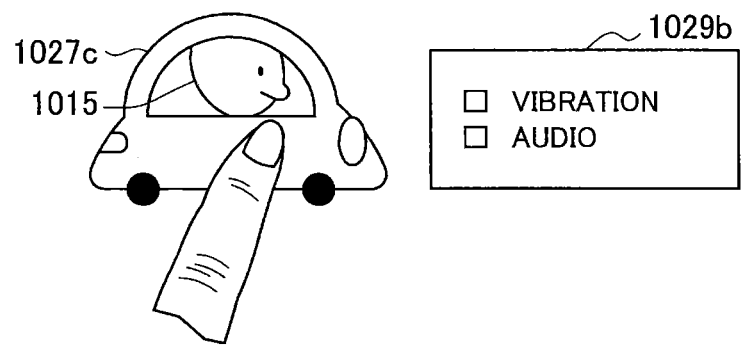
FIG. 13B is a view illustrating a third example of operation performed on an object in some embodiments of the present disclosure.

FIG. 13A and FIG. 13B are views each of which illustrates a third example of operation performed on an object in some embodiments of the present disclosure. In the examples of FIG. 13A and FIG. 13B, in the case where contact is terminated after the user object 1015 is pressed for a long time (without subsequently performing operation such as drag), a dialog box 1029 appears. The dialog box 1029 displays operation that can be executed with respect to a user in accordance with a behavior status of the user corresponding to the user object 1015 at that time.

For example, in the case of the stopping user object 1015 illustrated in FIG. 13A, "message", "vibration", and "audio" are displayed in a dialog box 1029a. By selecting each operation displayed in the dialog box 1029a, a corresponding operation is executed with respect to a target user. For example, in the case where the "message" is selected, the screen is changed to a transmission screen of a message to the target user. In the case where the "vibration" is selected, vibration notification to the target user is executed. In the case where the "audio" is selected, an audio telephone call with the target user is prepared.

Meanwhile, in the case of the user object 1015 which indicates that the corresponding user is moving by car because the user object 1015 rides the car 1027c as illustrated in FIG. 13B, "vibration" and "audio" are displayed in a dialog box 1029b. In this example, it is difficult to read a text message or reply to the text message during moving by car, and therefore, regarding the user object 1015 riding the car 1027c, "message" is not displayed in the dialog box 1029. Thus, in some embodiments of the present disclosure, operation executable via the user object 1015 is filtered in accordance with the kind of behavior status of a user expressed by the user object 1015.

Further, in some embodiments of the present disclosure, it is also possible to execute different kinds of operation with respect to a user represented by the user object 1015 on the basis of the kind of operation to select the user object 1015. For example, in the case where the user object 1015 is touched, display is changed to the log display 1017. In the case where the user object 1015 is touched twice, the display is changed to the message transmission screen. In the case where the user object 1015 is flicked toward a right side, the audio telephone call is prepared. In the case of shaking a terminal apparatus while tapping the user object 1015, vibration notification is executed with respect to a target user.

Further, in some embodiments of the present disclosure, the kind of operation performed on a user represented by the user object 1015 may be automatically selected when the user object 1015 is selected. For example, in the case where predetermined operation (for example, double tap) is executed with respect to the user object 1015 and the user represented by the user object 1015 is a user him/herself who performs the operation, posting a message to the social media is selected. In the case where the user represented by the user object 1015 is a friend, message transmission to the user is selected. In the case where the message transmission is performed and if a target user sits, transmission of a message with an image may be selected because it is presumed that the user can take a long time to read a message. In the case where the target user is moving by vehicle, vibration notification may be selected so as not to obstruct driving.

In a screen in which a behavior status of each user is displayed by use of the user object 1015 as illustrated in, for example, FIG. 6, a user object representing a user who is suitable to communicate may be emphasized. In this case, for example, the user object 1015 of a user, which indicates that the user is operating a terminal on the basis of behavior information, may be blinked on and off, and a mark may be displayed on a user object of a user who has posted a message to the social media within the last 5 minutes.

6. Grouping of User

With reference to FIG. 14 to FIG. 18, grouping of a user in some embodiments of the present disclosure will be described. In the behavior information sharing described above, the virtual space 1013 can be displayed for each group of users and the user objects 1015 representing the users classified in each group can be arranged in each virtual space 1013. In the following description, an example where grouping of a user is executed in a user interface including the virtual space 1013 will be described more specifically.

FIG. 14 is a view illustrating outline of grouping operation of a user in some embodiments of the present disclosure. As described above with reference to, for example, FIG. 5, in the list 1011 that displays users, the user objects 1023 showing behavior statuses of the respective users can be displayed. In the example of FIG. 14, users who can be grouped are displayed in the list 1011, and, by pressing, for a long time, the user object 1023 of an arbitrary user among those users and flicking the screen to a right or left side, the screen is switched to the virtual space 1013 while the user object 1023 pressed for a long time remains. Then, by dropping the user object in this virtual space 1013, the user object 1015 corresponding to the user is added to the virtual space 1013. In addition to this, the user is classified in a group corresponding to the virtual space 1013.

At this time, a user object 1031 displayed while the screen is being changed may be the same as the user object 1023, may be the same as the user object 1015, or may be different from the both. By further flicking the screen to the right or left side after the screen is switched to the virtual space 1013, still another virtual space 1013 may be displayed and the selected user may be classified in still another group.

As described above, the virtual space 1013 displayed in the UI 150 can be changed for each group in which the user is classified. Further, a reference used when behavior of the user is classified and a behavior status thereof is set may be changed for each virtual space 1013. For example, in the case where the virtual space 1013 corresponding to a certain group is a virtual space shaped like a bookstore ("Bookstore" town view), a behavior status regarding books may be classified in more detail in comparison with another virtual space and behavior statuses other than the behavior status regarding books may be roughly classified (for example, moving by train, bus, and vehicle is integrated as "moving").

Figure 15:
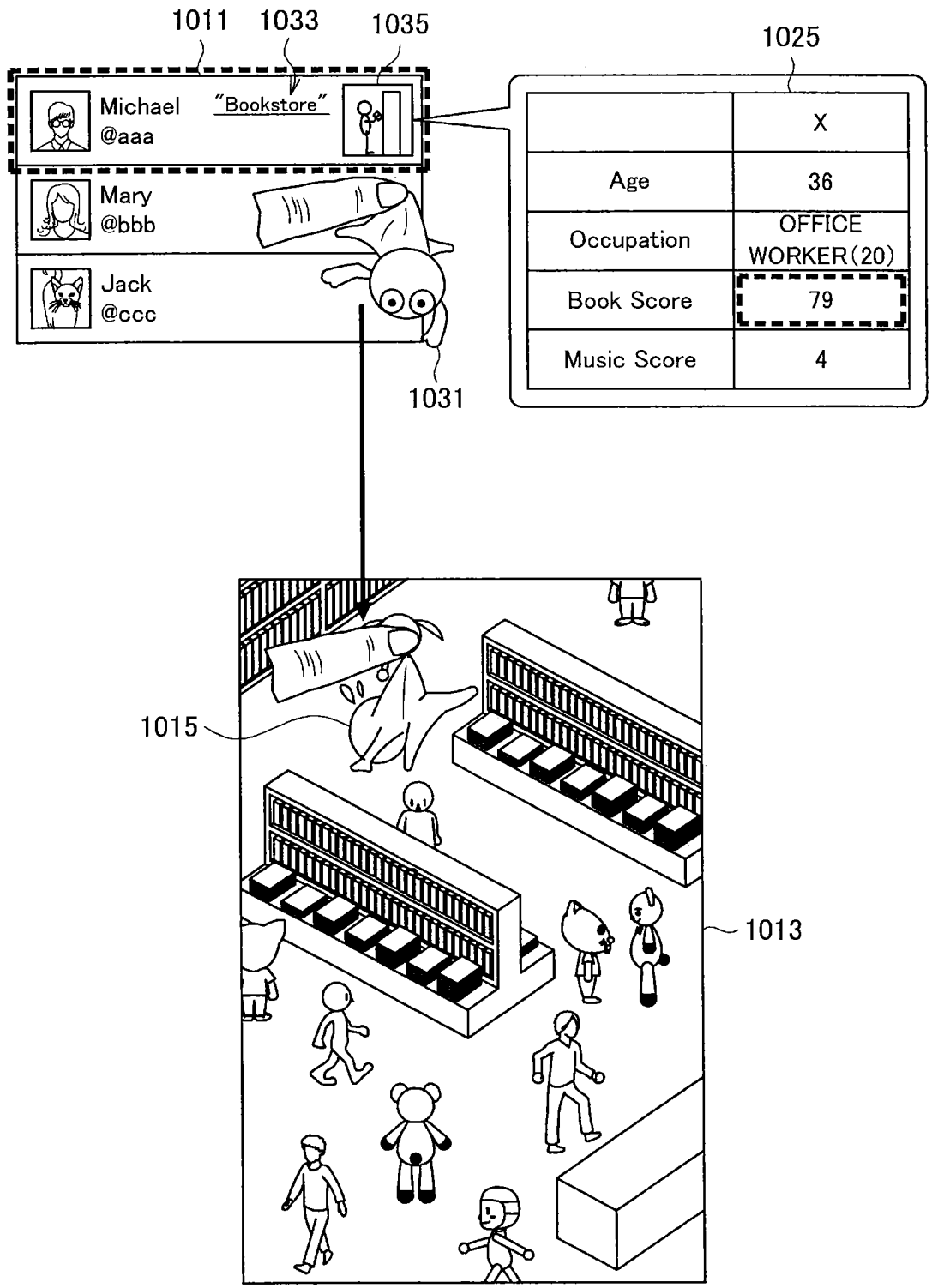
FIG. 15 is a view illustrating a first example of recommended group display in the grouping operation of the user illustrated in FIG. 14.

FIG. 15 is a view illustrating a first example of recommended group display in the grouping operation of the user illustrated in FIG. 14. In the example of FIG. 15, it is determined that a certain user is suitable to be classified in a group corresponding to a virtual space shaped like a bookstore ("Bookstore" town view) on the basis of the profile information 1025. In this case, in the information 1021 of this user displayed in the list 1011, text 1033 ("Bookstore") indicating, for example, a recommended group or virtual space may be displayed. Further, the user object 1023 corresponding to this user may be changed to an object 1035 corresponding to this group or virtual space.

As described above with reference to FIG. 14, a recommended group may be expressed in such a way that display of the virtual space 1013 is not changed when the user object 1023 displayed in the list 1011 is pressed for a long time and is moved to the virtual space 1013. In the example described above, the virtual space 1013 is configured based on the profile information 1025, behavior patterns, or the like of users classified in a group. Therefore, in the case where the user object 1015 representing a user different from users who have been already classified in the group is added to this virtual space 1013, a characteristic appearing in the profile information 1025, the behavior pattern, or the like is changed in some cases. For example, in the case where a user having a low "Book Score" is added to the virtual space 1013 corresponding to a group in which users having a relatively high "Book Score" are classified, an average value of "Book Scores" in the group is reduced and the virtual space ("Bookstore" town view) is not maintained, and therefore the virtual space 1013 becomes an average virtual space 1013 in some cases. In the example of FIG. 15, a change in the virtual space 1013 that may happen in the case where such a new user is added to the group may be displayed as a preview. Herein, no (or a little) change in the virtual space 1013 means that a user to be newly grouped and the users of the group have a common characteristic.

Figure 16:
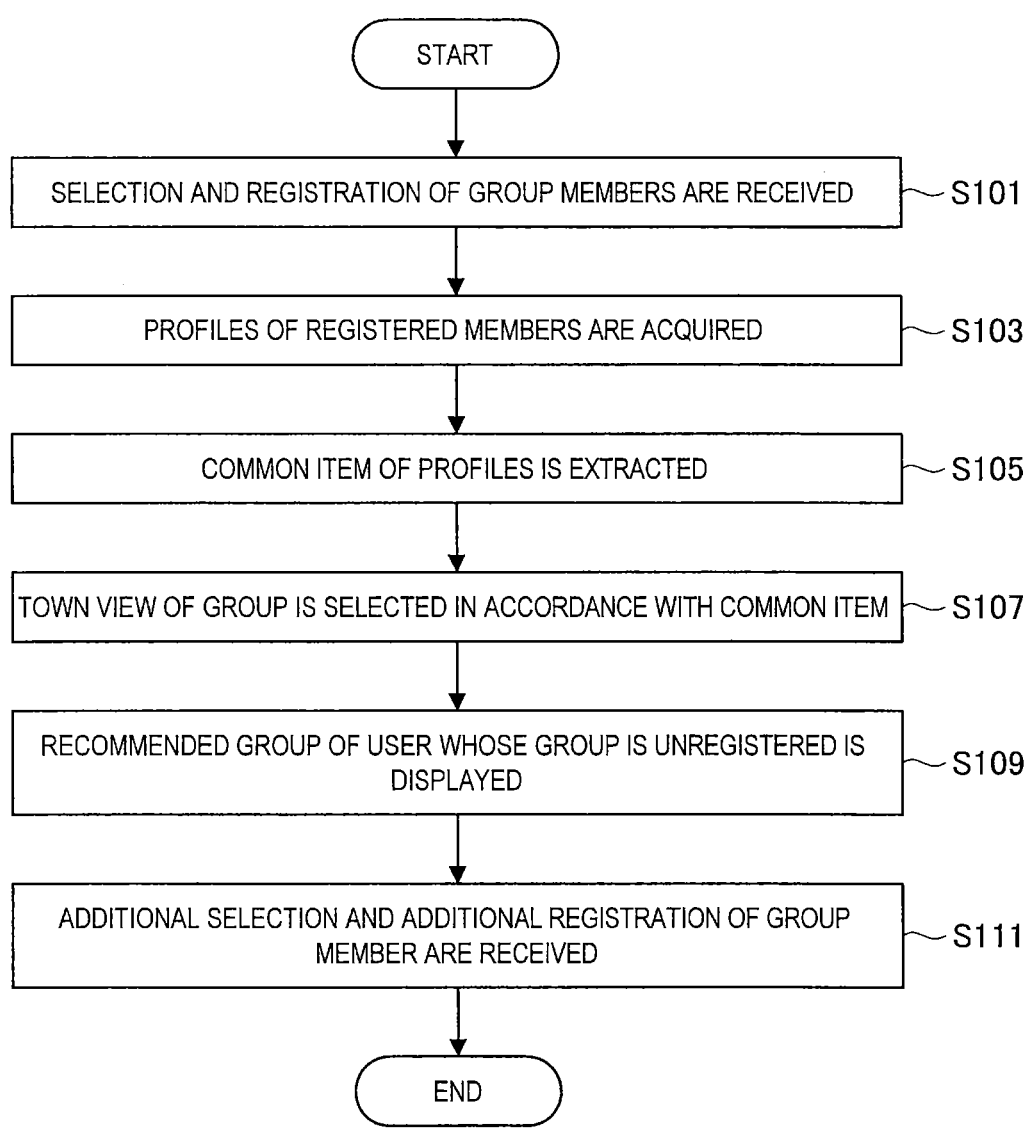
FIG. 16 is a flowchart illustrating processing of the example illustrated in FIG. 15.

FIG. 16 is a flowchart illustrating processing of the example illustrated in FIG. 15. The following processing can be, for example, processing of the control unit 140 illustrated in FIG. 1 to FIG. 3. First, selection and registration of group members are received (Step S101). The registration herein can be, for example, initial registration of the group members. In this case, in each group, properties of the group members or the virtual space 1013 to be displayed have not been set yet.

Next, profiles of the registered members are acquired (Step S103). The profiles acquired herein are information such as the profile information 1025 illustrated in the examples of, for example, FIG. 8 and FIG. 9 and can be information registered by each user, which is different from behavior information. Next, a common item of the profiles is extracted (Step S105). Herein, for example, a characteristic, such as a score value having a relatively high, low, or moderate level, is extracted as the common item among the users. Note that, whether the score is high or low may be determined, for example, based on a simple average value or may be determined in consideration of dispersion.

Next, a town view of a group is selected based on the common item extracted in Step S103 (Step S107). The town view herein is displayed as the virtual space 1013 in the above description and is, for example, the "Bookstore" town view and the "young & student" town view illustrated in the examples of FIG. 8 and FIG. 9. By the processing performed so far, setting of the virtual space 1013 corresponding to the group in which the members selected and registered in Step S101 are classified is completed.

After that, for example, in the case where a user who is not registered in the group exists among the users displayed in the list 1011, a recommended group is displayed (Step S109). The recommended group can be displayed by, for example, the method described above with reference to FIG. 15. The display is not limited to display that is automatically displayed such as the text 1033 and the object 1035, and the display may be display that is changed in response to predetermined operation performed by a user, such as presence or absence of a change occurring in the display when the user object 1023 is moved to the virtual space 1013.

Next, additional selection and additional registration of a group member are received (Step S111). The received additional selection and additional registration herein can be executed by a user who has referred to the display of the recommended group in Step S109. However, the user does not necessarily execute the additional selection and additional registration in accordance with the display of the recommended group and may ignore the display of the recommended group and execute the additional selection and additional registration. Although not illustrated, processing similar to that of Steps S103 to S107 is executed again after Step S111, and a town view suitable for the group after the additional selection and additional registration can be selected. Further, in the case where a user who is not registered in the group still exists, the recommended group display similar to that in Step S109 can be executed again.

Figure 17:
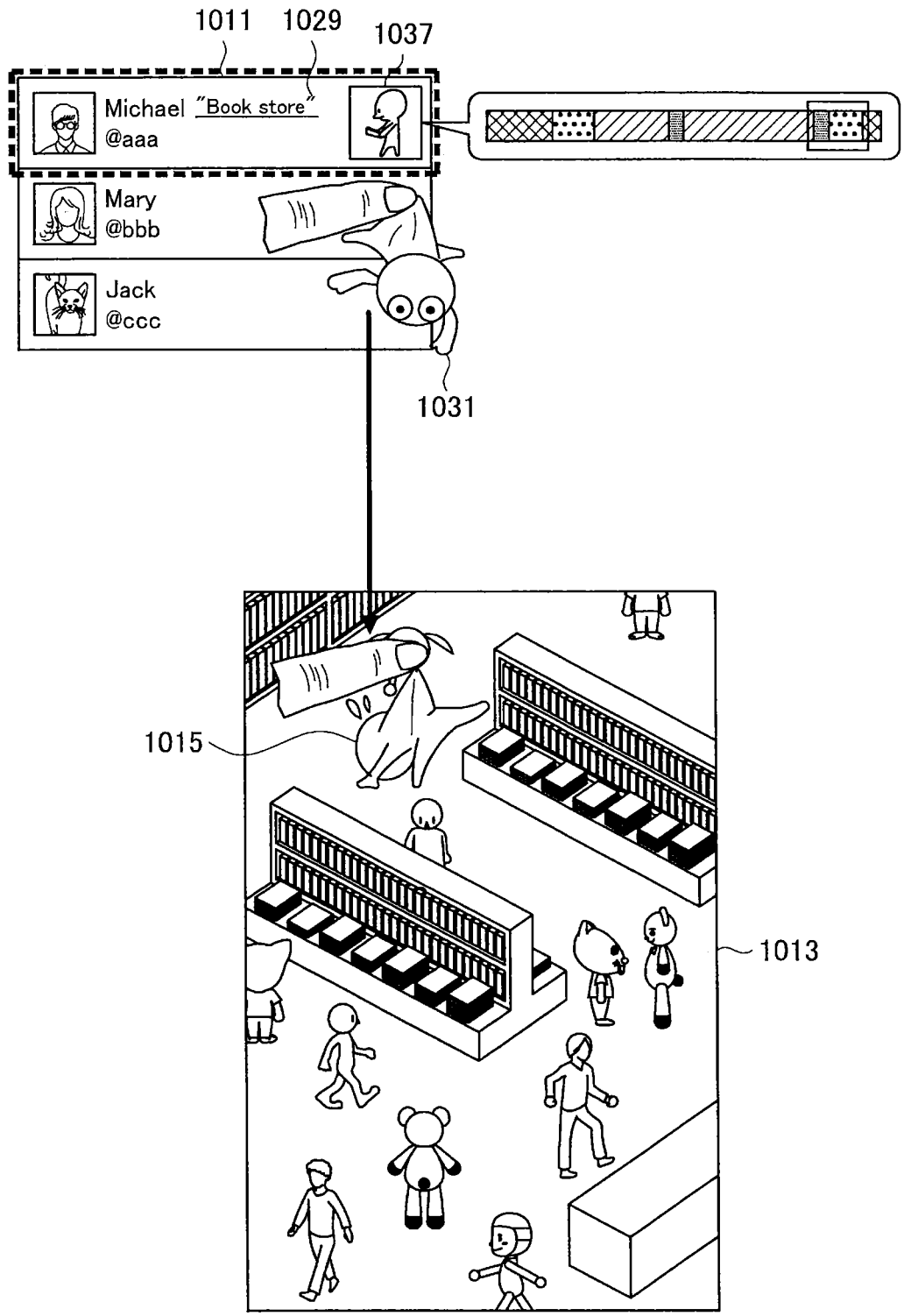
FIG. 17 is a view illustrating a second example of recommended group display in the grouping operation of the user illustrated in FIG. 14.

FIG. 17 is a view illustrating a second example of recommended group display in the grouping operation of the user illustrated in FIG. 14. In the example of FIG. 17, it is determined that a certain user is suitable to be classified in a group corresponding to a virtual space shaped like a bookstore ("Bookstore" town view) on the basis of a behavior pattern obtained from a behavior log in the past. In this case, in the information 1021 of this user displayed in the list 1011, for example, the text 1033 ("Bookstore") indicating the recommended group or virtual space may be displayed. Further, the user object 1023 corresponding to this user may be changed to an object 1037 showing behavior of the user corresponding to this group or virtual space. Further, in the same way as the example of FIG. 15, the recommended group may be expressed in such a way that display of the virtual space 1013 is not changed when the user object 1023 displayed in the list 1011 is pressed for a long time and is moved to the virtual space 1013.

Figure 18:
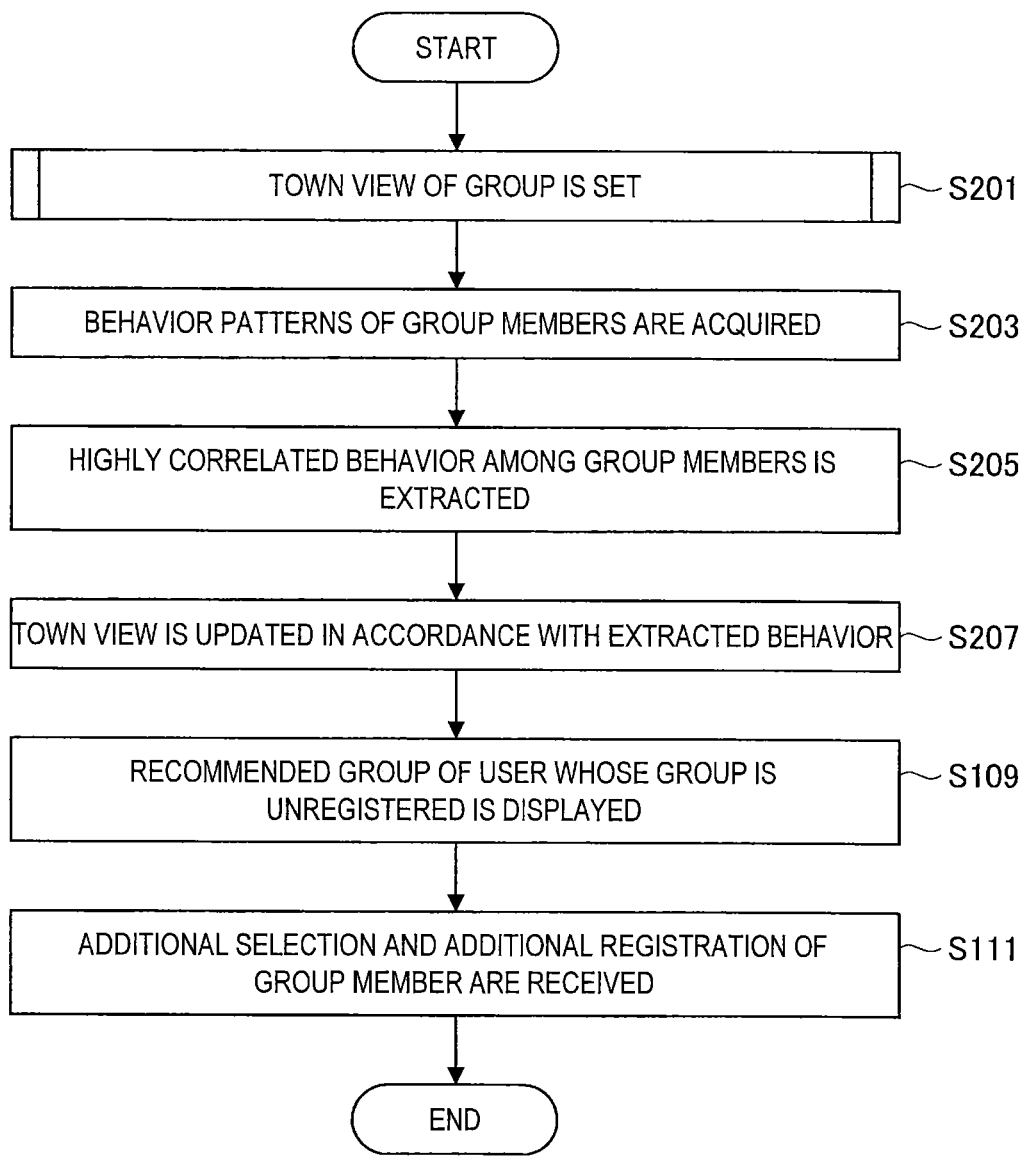
FIG. 18 is a flowchart illustrating processing of the example illustrated in FIG. 17.

FIG. 18 is a flowchart illustrating processing of the example illustrated in FIG. 17. The following processing can be, for example, processing of the control unit 140 illustrated in FIG. 1 to FIG. 3. First, by processing similar to that in Steps S101 to S107 illustrated in FIG. 16, a group in which users are classified and a town view corresponding to the group are set (Step S201). Next, behavior patterns of group members are acquired (Step S203). As the behavior patterns, a behavior pattern generated in advance on the basis of a behavior log of each member may be acquired or a behavior pattern may be newly generated based on the behavior log of each member at this time.

Further, highly correlated behavior among the group members is extracted based on the behavior patterns of the respective members acquired in Step S203 (Step S205). The "highly correlated behavior" herein may be extracted based on multiple references such as "the same behavior in the same time period" (for example, as illustrated in the example of FIG. 10, reading in the same time period every night), "the same behavior in the same day (weekday/holiday)" (for example, a user who moves by car for a long time on weekdays is presumed to use a car for work, and a user who moves by car for a long time on holidays is presumed to use a car at leisure), and "the same behavior having substantially the same length" (for example, even in the case of users who run every day, 15 minutes and 1 hour are different in terms of level) or may be simply extracted based on common behavior included in life patterns.

Next, the town view is updated in accordance with the behavior extracted in Step S205 (Step S207). The update of the town view herein may indicate, for example, replacement of the town view with a completely new town view or indicate addition or change of an object to be arranged in the virtual space 1013 such as the bus 1027 illustrated in the example of FIG. 11. In subsequent processing, a recommended group is displayed for a user whose group is unregistered (Step S109) and additional selection and additional registration of a group member are received (Step S111) in the same way as the example of FIG. 16.

7. Hardware Configuration

Figure 19:
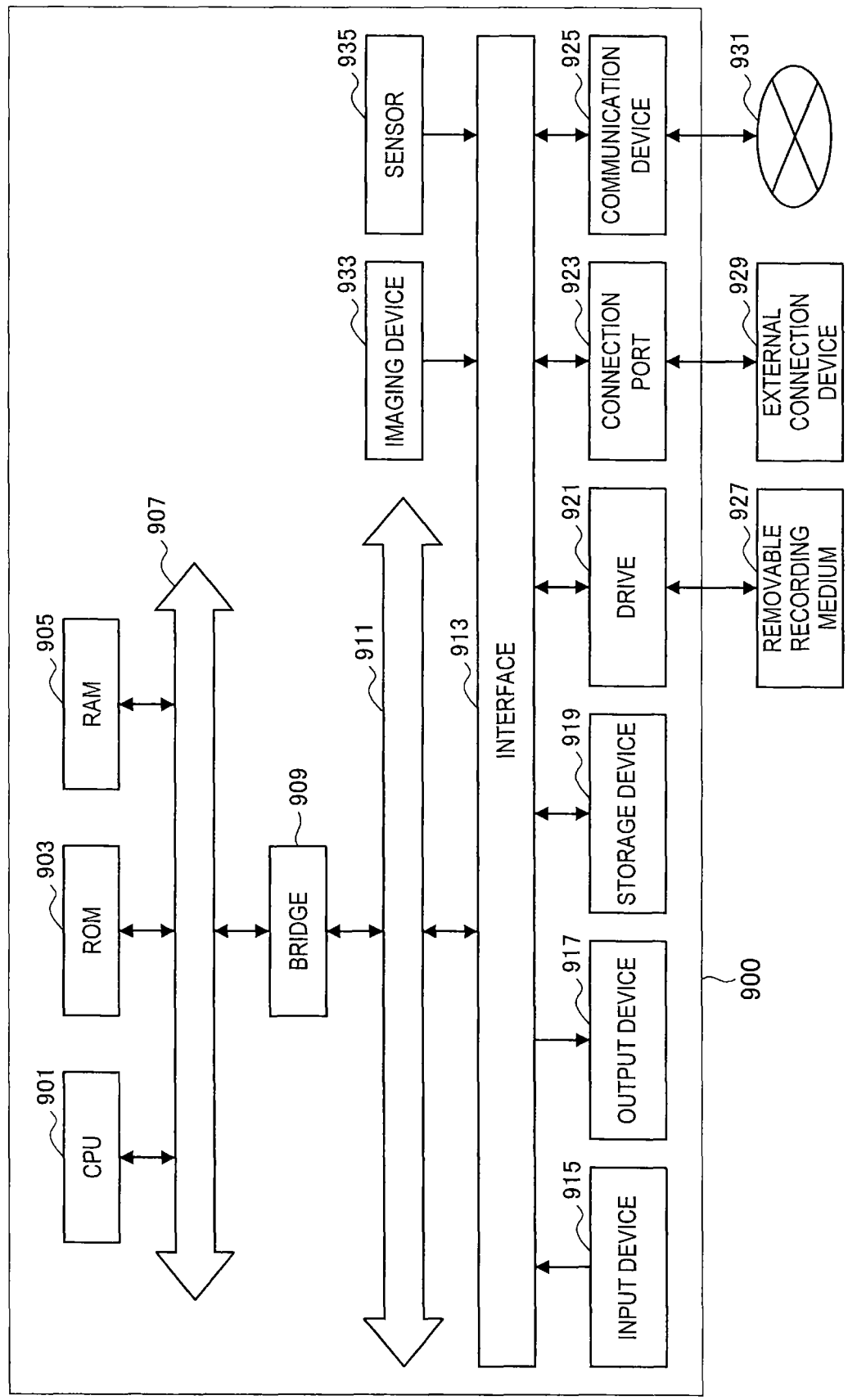
FIG. 19 is a block diagram showing a hardware configuration of an information processing apparatus.

Next, with reference to FIG. 19, a hardware configuration of an information processing apparatus according to an embodiment of the present disclosure will be described. FIG. 19 is a block diagram showing a hardware configuration of an information processing apparatus. An information processing apparatus 900 shown in FIG. 19 may achieve the terminal apparatus and the server in the above described embodiments, for example.

The information processing apparatus 900 includes a central processing unit (CPU) 901, read only memory (ROM) 903, and random access memory (RAM) 905. Further, the information processing apparatus 900 may also include a host bus 907, a bridge 909, an external bus 911, an interface 913, an input device 915, an output device 917, a storage device 919, a drive 921, a connection port 923, and a communication device 925. Furthermore, the information processing apparatus 900 may include an imaging device 933 and a sensor 935 as necessary. The information processing apparatus 900 may also include, instead of or along with the CPU 901, a processing circuit such as a digital signal processor (DSP).

The CPU 901 functions as an arithmetic processing unit and a control unit and controls an entire operation or a part of the operation of the information processing apparatus 900 according to various programs recorded in the ROM 903, the RAM 905, the storage device 919, or a removable recording medium 927. The ROM 903 stores programs and arithmetic parameters used by the CPU 901. The RAM 905 primarily stores programs used in execution of the CPU 901 and parameters and the like varying as appropriate during the execution. The CPU 901, the ROM 903, and the RAM 905 are connected to each other via the host bus 907 configured from an internal bus such as a CPU bus or the like. In addition, the host bus 907 is connected to the external bus 911 such as a peripheral component interconnect/interface (PCI) bus via the bridge 909.

The input device 915 is a device operated by a user, such as a mouse, a keyboard, a touch panel, buttons, a switch, and a lever. Also, the input device 915 may be a remote control device using, for example, infrared light or other radio waves, or may be an external connection device 929 such as a cell phone compatible with the operation of the information processing apparatus 900. The input device 915 includes an input control circuit that generates an input signal on the basis of information input by the user and outputs the input signal to the CPU 901. The user inputs various kinds of data to the information processing apparatus 900 and instructs the information processing apparatus 900 to perform a processing operation by operating the input device 915.

The output device 917 is configured from a device capable of visually or aurally notifying the user of acquired information. For example, the output device 917 may be: a display device such as a liquid crystal display (LCD), a plasma display panel (PDP), or an organic electro-luminescence (EL) display; an audio output device such as a speaker or headphones; or a printer. The output device 917 outputs results obtained by the processing performed by the information processing apparatus 900 as video in the form of text or an image or as audio in the form of audio or sound.

The storage device 919 is a device for storing data configured as an example of a storage unit of the information processing apparatus 900. The storage device 919 is configured from, for example, a magnetic storage device such as a hard disk drive (HDD), a semiconductor storage device, an optical storage device, or a magneto-optical storage device. This storage device 919 stores programs to be executed by the CPU 901, various data, and various data obtained from the outside.

The drive 921 is a reader/writer for the removable recording medium 927 such as a magnetic disk, an optical disc, a magneto-optical disk, or a semiconductor memory, and is built in or externally attached to the information processing apparatus 900. The drive 921 reads out information recorded on the attached removable recording medium 927, and outputs the information to the RAM 905. Further, the drive 921 writes the record on the attached removable recording medium 927.

The connection port 923 is a port for allowing devices to directly connect to the information processing apparatus 900. Examples of the connection port 923 include a universal serial bus (USB) port, an IEEE1394 port, and a small computer system interface (SCSI) port. Other examples of the connection port 923 may include an RS-232C port, an optical audio terminal, and a high-definition multimedia interface (HDMI) port. The connection of the external connection device 929 to the connection port 923 may enable the various data exchange between the information processing apparatus 900 and the external connection device 929.

The communication device 925 is a communication interface configured from, for example, a communication device for establishing a connection to a communication network 931. The communication device 925 is, for example, a wired or wireless local area network (LAN), Bluetooth (registered trademark), a communication card for wireless USB (WUSB), or the like. Alternatively, the communication device 925 may be a router for optical communication, a router for asymmetric digital subscriber line (ADSL), a modem for various communications, or the like. The communication device 925 can transmit and receive signals and the like using a certain protocol such as TCP/IP on the Internet and with other communication devices, for example. The communication network 931 connected to the communication device 925 is configured from a network which is connected via wire or wirelessly and is, for example, the Internet, a home-use LAN, infrared communication, radio wave communication, and satellite communication.

The imaging device 933 is a device which images a real space by use of various members including an image sensor such as a charge coupled device (CCD) or a complementary metal oxide semiconductor (CMOS) and a lens for controlling image formation of a subject on the image sensor, and generates a pickup image. The imaging device 933 may image a still image or a moving image.

The sensor 935 is any of various sensors such as an acceleration sensor, a gyro sensor, a magnetic field sensor, an optical sensor, a sound sensor, and a pressure sensor. For example, the sensor 935 acquires information related to the state of the information processing apparatus 900 itself, such as the posture of the housing of the information processing apparatus 900, or information related to the peripheral environment of the information processing apparatus 900, such as the brightness or noise around the information processing apparatus 900. Further, the sensor 935 may include a global positioning system (GPS) sensor which measures the latitude, the longitude, and the altitude of the apparatus by receiving a GPS signal.

Heretofore, an example of the hardware configuration of the information processing apparatus 900 has been shown. Each of the structural elements described above may be configured using a general-purpose material, or may be configured from hardware dedicated to the function of each structural element. The configuration may be changed as appropriate according to the technical level at the time of carrying out embodiments.

8. Supplement

The embodiments of the present disclosure may include the information processing apparatus (a terminal apparatus or a server), the system, the information processing method executed in the information processing apparatus or the system, the program for causing the information processing apparatus to function, and the non-transitory tangible media having the program recorded thereon, which have been described above, for example.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

An information processing apparatus including:

a first information acquisition unit configured to acquire first information indicating behavior of at least one user;

a second information acquisition unit configured to acquire second information on the at least one user, the second information being different from the first information; and a display control unit configured to display, in a display unit, a user object which is configured based on the first information and represents the corresponding at least one user and a virtual space which is configured based on the second information and in which the user object are arranged.

(2)

The information processing apparatus according to (1), wherein the display control unit combines the second information on the at least one user to set the virtual space that is common to the user object representing the corresponding at least one user.

(3)

The information processing apparatus according to (2), wherein the second information acquisition unit acquires the second information obtained by performing statistical processing on the information indicating the behavior of the at least one user.

(4)

The information processing apparatus according to (3), wherein the second information acquisition unit acquires the second information indicating a behavior pattern of the at least one user.

(5)

The information processing apparatus according to (4), wherein the display control unit changes a part or all of the virtual space with time on the basis of the behavior pattern.

(6)

The information processing apparatus according to any one of (2) to (5), wherein the second information acquisition unit acquires the second information indicating an attribute of the at least one user.

(7)

The information processing apparatus according to (6), wherein the second information acquisition unit acquires the second information generated based on age, an occupation, or a product purchase history of the at least one user.

(8)

The information processing apparatus according to any one of (1) to (7), wherein the display control unit configures the virtual space for each group in which the at least one user is classified and arranges the user object in the virtual space corresponding to a group in which each user is classified.

(9)

The information processing apparatus according to (8), wherein, regarding a user who is not classified in the group, the display control unit displays, in the display unit, text or an image showing a group to which the user is recommended to be classified.

(10)

The information processing apparatus according to (8) or (9), wherein, regarding a user who is not classified in the group, by displaying, as a preview, a change in the virtual space occurring in a case where the user is arranged in the virtual space, the display control unit indicates whether or not a group corresponding to the virtual space is a group to which the user who is not classified in the group is recommended to be classified.

(11)

The information processing apparatus according to any one of (1) to (10), wherein the display control unit shows, by use of display of the user object, a behavior status obtained by classifying the behavior of each user on the basis of a predetermined reference.

(12)

The information processing apparatus according to (11), wherein the display control unit shows the behavior status of each user by using a shape or a motion of the user object.

(13)

The information processing apparatus according to (11) or (12), wherein the display control unit arranges a container object corresponding to the behavior status in the virtual space and shows the behavior status of each user by displaying the user object in the container object.

(14)

The information processing apparatus according to (13), wherein the display control unit displays the container object on the basis of a behavior pattern of the at least one user.

(15)

The information processing apparatus according to (14), wherein the display control unit displays the container object, regardless of whether or not the at least one user performs behavior in accordance with the behavior pattern.

(16)

The information processing apparatus according to any one of (13) to (15),
wherein the display control unit changes a number or a size of the container objects in accordance with a number of users having behavior statuses corresponding to the container object.

(17)

The information processing apparatus according to any one of (11) to (16),
wherein the display control unit changes the reference for classifying the behavior status depending on the virtual space.

(18)

A system including:
a terminal apparatus; and
one or more server devices configured to provide a service to the terminal apparatus,
wherein the system provides, by cooperating the terminal apparatus with the one or more server devices,
a function for acquiring first information indicating behavior of at least one user,
a function for acquiring second information on the at least one user, the second information being different from the first information, and
a function for displaying, in a display unit, a user object which is configured based on the first information and represents the corresponding at least one user, and a virtual space which is configured based on the second information and in which the user object is arranged.

(19)

An information processing method including:
acquiring first information indicating behavior of at least one user;
acquiring second information on the at least one user, the second information being different from the first information; and
displaying, in a display unit, a user object which is configured based on the first information and represents the corresponding at least one user, and a virtual space which is configured based on the second information and in which the user object is arranged.

(20)

A program causing a computer to realize
a function for acquiring first information indicating behavior of at least one user,
a function for acquiring second information on the at least one user, the second information being different from the first information, and
a function for displaying, in a display unit, a user object which is configured based on the first information and represents the corresponding at least one user, and a virtual space which is configured based on the second information and in which the user object is arranged.

REFERENCE SIGNS LIST 10, 30, 50 system
100, 300, 500 terminal apparatus
200, 400, 600 server
110 sensor
120 behavior recognition unit
130, 530 communication unit
140 control unit
150 UI

The invention claimed is:
1. An information processing apparatus comprising circuitry configured to:
acquire behavior information of each user of a group of users based on recognition of a detection result of acceleration;
configure a virtual space corresponding to the group of users based on profile information of each user of the group of users;
determine behavior patterns for each user of the group of users by performing statistical processing on the behavior information of each user of the group of users;
extract highly correlated behavior among the group of users based on the behavior patterns of each user of the group of users, wherein highly correlated behavior indicates a same behavior in a same period of time or a same behavior having a same length of time;
update the virtual space based on the extracted highly correlated behavior; and
display user objects representing each user of the group of users in the virtual space.

2. The information processing apparatus according to claim 1,
wherein the virtual space to which a user of the group of users belongs is configured based on information regarding the user on a time axis.

3. The information processing apparatus according to claim 1,
wherein the behavior information further indicates attributes of the group of users.

4. The information processing apparatus according to claim 1,
wherein the profile information comprises an age, an occupation, or a product purchase history of at least one user of the group of users.

5. The information processing apparatus according to claim 1,
wherein, regarding a user who does not belong to the group of users, the circuitry controls display of text or an image showing another group to which the user is recommended to belong.

6. The information processing apparatus according to claim 1,
wherein, regarding a user who is not classified in the group of users, by displaying, as a preview, a change in a corresponding virtual space in which the user is arranged in the corresponding virtual space, the circuitry indicates whether or not a second group corresponding to the corresponding virtual space is a group to which the user who is not classified in the group is recommended to be classified.

7. The information processing apparatus according to claim 1,
wherein the circuitry controls display of the user object with a behavior status obtained by classifying the behavior of each user on the basis of a predetermined reference.

8. The information processing apparatus according to claim 7,
wherein the circuitry controls a display of a behavior status of each user by using a shape or a motion of the user object.

9. The information processing apparatus according to claim 8,
wherein the circuitry shows the behavior status of each user by displaying the user object in a corresponding container object.

10. The information processing apparatus according to claim 9,
    wherein the circuitry controls a display of the container object on the basis of the behavior pattern of each user of the group of users.
11. The information processing apparatus according to claim 10,
    wherein the circuitry controls a display of the container object, regardless of whether or not each user of the group of users performs a behavior in accordance with a behavior pattern.
12. The information processing apparatus according to claim 9,
    wherein the circuitry changes a number of container objects or a size of the container object in accordance with a number of users having behavior statuses corresponding to the container object.
13. The information processing apparatus according to claim 7,
    wherein the circuitry changes the predetermined reference for classifying a behavior of each user.
14. The information processing apparatus according to claim 1, wherein
    the circuitry is further configured to provide a sharing list of the users who are logged into the information processing apparatus.
15. The information processing apparatus according to claim 1, wherein
    the circuitry is further configured to control a display of a behavior log of a target user upon selection of the target user.
16. The information processing apparatus according to claim 15, wherein
    the behavior log is expressed by a graph showing a ratio of behavior information performed by the target user that day or a behavior pattern of the behavior information in the past.
17. The information processing apparatus according to claim 14, wherein a display of the sharing list includes the user object, a thumbnail image, or user name.
18. The information processing apparatus according to claim 1, wherein
    the behavior information is set to be open to another user or is set to be closed to the another user.
19. The information processing apparatus according to claim 1, wherein the circuitry is further configured to configure the virtual space via clustering of second information.
20. A non-transitory computer readable medium storing instructions that, when executed by a processor, performs an information processing method, the method comprising:
    acquiring behavior information of each user of a group of users based on recognition of a detection result of acceleration;
    configuring a virtual space corresponding to the group of users based on profile information of each user of the group of users;
    determining behavior patterns for each user of the group of users by performing statistical processing on the behavior information of each user of the group of users;
    extracting highly correlated behavior among the group of users based on the behavior patterns of each user of the group of users, wherein highly correlated behavior indicates a same behavior in a same period of time or a same behavior having a same length of time;
    updating the virtual space based on the extracted highly correlated behavior; and
    displaying user objects representing each user of the group of users in the virtual space.
21. The non-transitory computer readable medium according to claim 20,
    wherein the circuitry is configured to obtain the statistical information via statistical processing on the behavior information of the multiple users.
22. The non-transitory computer readable medium according to claim 20,
    wherein the virtual space to which a user of the group of users belongs is configured based on information regarding the user on a time axis.
23. The non-transitory computer readable medium according to claim 21,
    wherein the behavior information further indicates attributes of the group of users.
24. The non-transitory computer readable medium according to claim 23,
    wherein the profile information comprises an age, an occupation, or a product purchase history of at least one user of the group of users.
25. The non-transitory computer readable medium according to claim 20,
    wherein, regarding a user who does not belong to the group of users, the method further comprises controlling display of text or an image showing another group to which the user is recommended to belong.
26. The non-transitory computer readable medium according to claim 20,
    wherein, regarding a user who is not classified in the group of users, by displaying, as a preview, a change in a corresponding virtual space in which the user is arranged in the corresponding virtual space, the method comprises indicating whether or not a second group corresponding to the corresponding virtual space is a group to which the user who is not classified in the group is recommended to be classified.
27. The non-transitory computer readable medium according to claim 20,
    wherein the circuitry controls display of the user object with a behavior status obtained by classifying the behavior of each user on the basis of a predetermined reference.
28. The non-transitory computer readable medium according to claim 27,
    wherein the method comprises controlling a display of a behavior status of each user by using a shape or a motion of the user object.
29. The non-transitory computer readable medium according to claim 27,
    wherein the method comprises showing the behavior status of each user by displaying the user object in a corresponding container object.
30. The non-transitory computer readable medium according to claim 29,
    wherein the method comprises controlling a display of the container object on the basis of the behavior pattern of each user of the group of users.
31. The non-transitory computer readable medium according to claim 27,
    wherein the method comprises controlling a display of the container object, regardless of whether or not each user of the group of users performs a behavior in accordance with a behavior pattern.

32. The non-transitory computer readable medium according to claim 31,
   wherein the method comprises changing a number of container objects or a size of the container object in accordance with a number of users having behavior statuses corresponding to the container object.

33. The non-transitory computer readable medium according to claim 24,
   wherein the method comprises changing a reference for classifying a behavior of each user.

34. An information processing method comprising:
   acquiring behavior information of each user of a group of users based on recognition of a detection result of acceleration;
   configuring a virtual space corresponding to the group of users based on profile information of each user of the group of users;
   determining behavior patterns for each user of the group of users by performing statistical processing on the behavior information of each user of the group of users;
   extracting highly correlated behavior among the group of users based on the behavior patterns of each user of the group of users, wherein highly correlated behavior indicates a same behavior in a same period of time or a same behavior having a same length of time;
   updating the virtual space based on the extracted highly correlated behavior; and
   displaying user objects representing each user of the group of users in the virtual space.

* * * * *